US008530124B2

(12) United States Patent
Sakaguchi et al.

(10) Patent No.: US 8,530,124 B2
(45) **Date of Patent: *Sep. 10, 2013**

(54) HYDROXYGALLIUM PHTHALOCYANINE COMPOSITE PIGMENT, ELECTROPHOTOGRAPHIC PHOTOCONDUCTOR CONTAINING THE SAME, AND IMAGE FORMING DEVICE AND PROCESS CARTRIDGE FOR IMAGE FORMING DEVICE USING THE SAME

(75) Inventors: Hiromi Sakaguchi, Kanagawa (JP); Masafumi Ohta, Shizuoka (JP); Yoshiki Yanagawa, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 335 days.

This patent is subject to a terminal disclaimer.

(21) Appl. No.: 12/965,262

(22) Filed: Dec. 10, 2010

(65) Prior Publication Data

US 2011/0159418 A1 Jun. 30, 2011

(30) Foreign Application Priority Data

Dec. 28, 2009 (JP) ................................ 2009-298614

(51) Int. Cl.
*G03G 5/00* (2006.01)
*G03G 15/06* (2006.01)
*C09B 47/04* (2006.01)

(52) U.S. Cl.
USPC .............. 430/78; 430/56; 430/59.4; 399/159; 540/140

(58) Field of Classification Search
USPC .......... 430/56, 59.1, 59.2, 59.4, 78; 540/140; 399/159
See application file for complete search history.

(56) References Cited

U.S. PATENT DOCUMENTS

| | | | | |
|---|---|---|---|---|
| 2009/0005546 A1* | 1/2009 | Ohta | ............................ | 534/658 |
| 2010/0010204 A1* | 1/2010 | Ohta et al. | .................... | 534/588 |
| 2010/0310975 A1* | 12/2010 | Tada et al. | ....................... | 430/56 |
| 2011/0159420 A1* | 6/2011 | Sakaguchi et al. | .............. | 430/69 |

FOREIGN PATENT DOCUMENTS

| | | |
|---|---|---|
| JP | 7-128888 | 5/1995 |
| JP | 9-143386 | 6/1997 |
| JP | 3166293 | 3/2001 |
| JP | 2001-290296 | 10/2001 |

(Continued)

OTHER PUBLICATIONS

U.S. Appl. No. 12/978,787, filed Dec. 27, 2010, Sakaguchi, et al.

*Primary Examiner* — Mark F Huff
*Assistant Examiner* — Stewart Fraser
(74) *Attorney, Agent, or Firm* — Oblon, Spivak, McClelland, Maier & Neustadt, L.L.P.

(57) ABSTRACT

A hydroxygallium phthalocyanine composite pigment, which is a composite pigment wherein an azo compound expressed by the following general formula (a) is conjugated to a hydroxygallium phthalocyanine pigment, wherein the hydroxygallium phthalocyanine composite pigment has diffraction peaks at least at 7.5°, 9.9°, 12.5°, 16.3°, 18.6°, 25.1°, and 28.3° on an X-ray diffraction spectrum with Bragg angle of 2θ±0.2°, using Cu—Kα X-rays:

$$A(H)_n \qquad \text{General Formula (a)}$$

where A is a residue of an azo compound; H is a hydrogen atom; the residue A is bonded to one or more hydrogen atoms, where the number of the hydrogen atoms is expressed with n, via one or more heteroatoms which are selected from the group consisting of N and O, and form part of the residue A; and n is an integer of 1 to 9.

9 Claims, 6 Drawing Sheets

(56) References Cited

FOREIGN PATENT DOCUMENTS

| | | |
|---|---|---|
| JP | 3635786 | 1/2005 |
| JP | 2005-208618 | 8/2005 |
| JP | 2006-18267 | 1/2006 |
| JP | 3758246 | 1/2006 |
| JP | 2006-72304 | 3/2006 |
| JP | 3792909 | 4/2006 |
| JP | 3838385 | 8/2006 |
| JP | 2006-299269 | 11/2006 |
| JP | 3880225 | 11/2006 |
| JP | 2007-34210 | 2/2007 |
| JP | 3994638 | 8/2007 |
| JP | 2007-334099 | 12/2007 |
| JP | 2008-15532 | 1/2008 |
| JP | 4194184 | 10/2008 |
| JP | 2010-235909 | 10/2010 |

* cited by examiner

HYDROXYGALLIUM PHTHALOCYANINE COMPOSITE PIGMENT, ELECTROPHOTOGRAPHIC PHOTOCONDUCTOR CONTAINING THE SAME, AND IMAGE FORMING DEVICE AND PROCESS CARTRIDGE FOR IMAGE FORMING DEVICE USING THE SAME

BACKGROUND OF THE INVENTION

1. Field of the Invention

The present invention relates to: a hydroxygallium phthalocyanine composite pigment effective as a photosensitive material for electrophotography, a material for photoelectric conversion elements, and a material for organic semiconductor elements; a highly stable electrophotographic photoconductor which is highly sensitive, can be used repeatedly, and stably output images under any environmental conditions; and an image forming device and a process cartridge for an image forming device, both using such electrophotographic photoconductor.

2. Description of the Related Art

There has been increasing demands for commercial or industrial printing using laser printers or digital photocopiers of electrophotographic system. Therefore, electrophotographic laser printers or digital photocopiers are required to provide higher quality of prints and to have higher reliability under severe conditions during use.

Electrophotographic photoconductors used for image forming devices of such laser printers or digital photocopiers would contribute to improvements of quality of prints and reliability by stably exhibiting sufficient charging functions and photo-induced discharging functions.

Currently, electrophotographic photoconductors using organic photosensitive materials are widely used for the reasons of cost, productivity, and low environmental loads. The important constitutional substances of a photoconductor include a charge-generating material and a charge-transporting material, and the characteristics of these materials give large influence to the charging function and photo-induced discharging function of the resulting photoconductor. The charge-generating material, which is related to the present invention, is principally required to have sensitivity to the wavelength of the light signal used for exposure. Laser diodes or LEDs are currently mainly used as an exposing unit, and the light having long wavelengths, such as an emission wavelength of 650 nm to 780 nm, is commonly used. As the charge-generating material having photosensitivity in such wavelength range, phthalocyanine pigments are especially widely applied.

Various phthalocyanine pigments are available for use, such as non-metal phthalocyanine pigments, copper phthalocyanine pigments, titanylphthalocyanine pigments, chlorogallium phthalocyanine pigments, and hydroxygallium phthalocyanine pigments. Among them, hydroxygallium phthalocyanine pigments are known to be stably used with a small environmental dependency regarding the photosensitivity thereof. Examples of hydroxygallium phthalocyanine are disclosed in Japanese Patent (JP-B) No. 3166293.

In the case where the phthalocyanine pigment is used for a charge-generating layer of an electrophotographic photoconductor, however, unintentional electrostatic latent image is formed due to accumulation of electrons, which may lower quality of prints. Hydroxygallium phthalocyanine is not exceptional, and the same problem is seen also when hydroxygallium phthalocyanine is used.

To solve such problem, the technique in which an electron-accepting material is added to a charge-generating layer has been disclosed. For example, there have been reported (see Japanese Patent Application Laid-Open (JP-A) Nos. 2006-018267 and 2005-208618) that, in the case where gallium phthalocyanine is used as a charge-generating material, a charge-generating layer and an undercoat layer both contain an electron-accepting material in the state of molecular dispersion, by dissolving the electron-accepting material in a charge-generating layer coating liquid, and applying such coating liquid. In this case, however, the contactability between the charge-generating material and the electron-accepting material may be insufficient because of poor solubility of the electron-accepting material or concentration deviation generated in the layer, so that generated electrons cannot be efficiently passed to the electron-accepting material. Therefore, the sensitivity is not improved sufficiently. Moreover, there have been reported (see JP-A Nos. 2008-015532 and 2007-034210) that an electron-accepting material such as polycyclic quinine pigment is added to a charge-generating layer using a phthalocyanine-based pigment as a charge-generating material. These proposals aim to improve sensitivity and to suppress residual potential with the charge-generating layer having such components. However, as the electron-accepting material is added to the charge-generating layer coating liquid to form the charge-generating layer, the location of the electron-accepting material present in the charge-generating layer is unintentional. Therefore, there are cases where the electron-accepting material is not sufficiently in contact with the charge-generating material within the charge-generating layer, and thus significant improvement of sensitivity cannot be expected. In addition, when a large number of prints are formed, a sufficient effect for suppressing the residual potential cannot be expected.

Moreover, a technique for mixing two or more pigments has been disclosed. For the purpose of expanding the correspondable exposure wavelength range, increasing sensitivity, or improving potential stability, for example, mixing two or more pigments has been proposed, such as a mixture of non-metal phthalocyanine and a fluorenone-based azo pigment (see JP-A No. 2001-290296), a mixture of a phthalocyanine compound and an azo pigment (see JP-B No. 3758246), a mixture of metal phthalocyanine and a perylene-hybrid pigment (see JP-B No. 3994638), and a mixture of a quinacridon pigment and a titanyl phthalocyanine pigment (JP-A No. 2007-334099).

Especially, regarding gallium phthalocyanine, there have been proposed techniques (see JP-B Nos. 4194184, 3880225, and 3792909, and JP-A No. 07-128888) in which an azo pigment and a gallium phthalocyanine pigment are used in the mixture for the purpose of expanding the correspondable exposure wavelength range and increasing photosensitivity. In any of these techniques, however, the pigments are mixed while dispersing the pigments, or mixed by mixing dispersion liquids each containing a pigment, and thus the charge-generating layer formed in such manner contains the mixed pigments having a distance to each other in the molecular level. Therefore, although desirable characteristics of each pigment can be provided to the resulting photoconductor, the synergistic effect between these pigments cannot be brought out, and thus any significant effect cannot be attained. Moreover, there has been proposed (see JP-A No. 2006-072304) that a phthalocyanine pigment and an electron-accepting material are formed into a composite, by presenting the electron-accepting material aside during the process of crystal conversion of phthalocyanine. However, many of the electron-accepting materials for use are generally poor in solubility. In the case where the solubility of the electron-accepting material is poor, it is difficult to make the charge-generating material sufficiently in contact with the electron-accepting material at the molecular level even though the electron-accepting material is allowed to be present aside of the phthalocyanine during the process of crystal conversion. Even if the electron-accepting material is adjacent to the surface of the pigment, a sufficient effect cannot be attained. If the electron-accepting material having excellent solubility is used, even though it is formed into a composite, the electron-accepting material is dissolved out at the time when a charge-generating layer coating liquid is prepared by dispersing the formed composite in an organic solvent. Therefore, desirable effects cannot be attained.

Moreover, there has been proposed a technique in which a pigment of a charge-generating material is used in the form of a mixed crystal. For example, it has been proposed that a mixed crystal of gallium phthalocyanine and other phthalocyanine is used (see JP-A Nos. 09-143386, and 2006-299269). As a result of this, the dispersibility thereof is improved. However, decrease in the crystallinity thereof cannot be avoided because different molecules are combined to form a crystal, and thus sufficient sensitivity cannot be obtained.

Furthermore, there have been proposed techniques (JP-B Nos. 3838385, and 3635786) in which the electron trap is inhibited by introducing an electron-absorbing group into a phthalocyanine molecule. However, in this method, as there is a structural change in the phthalocyanine ring, desirable crystal shapes may not be attained, crystallinity thereof is decreased, etc., and therefore, the sufficient sensitivity thereof is not necessarily attained.

As mentioned above, it is desired to provide a charge-generating material in use for electrophotographic photoconductor, which is highly sensitive in a wide wavelength range, and stably exhibiting a characteristic of electrophotography without accumulating electric charge, and various developments have been attempt to this end. However, it is a current situation that there have not been realized a charge-generating material and an electrophotographic photoconductor comprehensively satisfying such characteristics.

BRIEF SUMMARY OF THE INVENTION

The present invention aims at solving the various problems in the art and achieving the following objects. An object of the present invention is to provide a hydroxygallium phthalocyanine composite pigment, which is a novel charge-generating material, capable of providing high quality prints for a long period of time without causing any image failure by suppressing accumulation of electric charge, which is caused by the charge-generating material, and capable of outputting images of stable image quality under any environmental condition. Another object of the present invention is to provide an electrophotographic photoconductor, an image forming device, and a process cartridge for an image forming device, using such material.

Means for solving the aforementioned problem are as follows:

<1> A hydroxygallium phthalocyanine composite pigment, which is a composite pigment wherein an azo compound expressed by the following general formula (a) is conjugated to a hydroxygallium phthalocyanine pigment, wherein the hydroxygallium phthalocyanine composite pigment has diffraction peaks at least at 7.5°, 9.9°, 12.5°, 16.3°, 18.6°, 25.1°, and 28.3° on an X-ray diffraction spectrum with Bragg angle of 2θ±0.2°, using Cu—Kα X-rays:

$A(H)_n$ General Formula (a)

where A is a residue of an azo compound; H is a hydrogen atom; the residue A is bonded to one or more hydrogen atoms, where the number of the hydrogen atoms is expressed with n, via one or more heteroatoms which are selected from the group consisting of N and O, and form part of the residue A; and n is an integer of 1 to 9.

<2> The hydroxygallium phthalocyanine composite pigment according to <1>, wherein the hydroxygallium phthalocyanine pigment is present beside when the azo compound having a carboester group expressed by the following general formula (I) is dissolved and de-esterified to form the azo compound expressed by the general formula (a):

$A(E)_n$ General Formula (I)

where A is a residue of an azo compound, which is bonded to E groups, where the number of the E groups is expressed with n, via one or more hetero atoms which are selected from the group consisting of N and O and form part of the residue A; the E groups are each independently selected from the group consisting of a hydrogen atom and a carboester group expressed by: —C(═O)—O—$R^0$ where $R^0$ is a C4-10 substituted or unsubstituted alkyl group, a C4-10 substituted or unsubstituted alkenyl group, a C4-10 substituted or unsubstituted alkynyl group, a C4-10 substituted or unsubstituted cycloalkyl group, a C4-10 substituted or unsubstituted cycloalkenyl group, or a C4-10 substituted or unsubstituted aralkyl group, provided that there is no case where all of the E groups are hydrogen atoms; and n is an integer of 1 to 9.

<3> The hydroxygallium phthalocyanine composite pigment according to any of <1> or <2>, wherein the azo compound expressed by any of the general formulae (a) and (I) is an azo compound including the residue A expressed by the following general formula (2):

$B—(N═N\text{-}Cp)_m$ General Formula (2)

where B is a principal skeleton of an azo compound, Cp is a residue of a coupler component, and m is an integer of 2 or 3.

<4> The hydroxygallium phthalocyanine composite pigment according to <3>, wherein wherein Cp is the residue of the coupler component, expressed by at least one of the following general formulae (3) to (11):

General Formula (3)

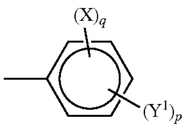

General Formula (4)

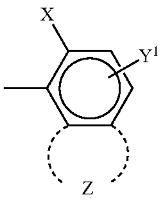

General Formula (5)

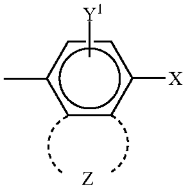

-continued

General Formula (6)

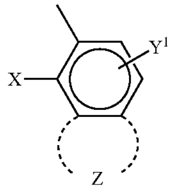

where X, $Y^1$, Z, p and q are each as follows:

X: —OH, —$N(R^1)(R^2)$, or —$NHSO_2$—$R^3$, where $R^1$ and $R^2$ are each independently a hydrogen atom, or a substituted or unsubstituted alkyl group, and $R^3$ is a substituted or unsubstituted alkyl group, or a substituted or unsubstituted aryl group, $Y^1$: a hydrogen atom, a halogen atom, a substituted or unsubstituted alkyl group, a substituted or unsubstituted alkoxy group, a carboxyl group, a sulfone group, a substituted or unsubstituted sulfamoyl group, or —$CON(R^4)(Y^2)$, where $R^4$ is a hydrogen atom, a substituted or unsubstituted alkyl group, or a substituted or unsubstituted phenyl group; $Y^2$ is a substituted or unsubstituted hydrocarbon cyclic group, a substituted or unsubstituted heterocyclic group, or —N═C$(R^5)(R^6)$, in which $R^5$ is a substituted or unsubstituted hydrocarbon cyclic group, a substituted or unsubstituted heterocyclic group, or a substituted or unsubstituted styryl group, $R^6$ is a hydrogen atom, a substituted or unsubstituted alkyl group, a substituted or unsubstituted phenyl group, or $R^5$ and $R^6$ may form a ring with carbon atoms bonded to $R^5$ and $R^6$, Z: a substituted or unsubstituted hydrocarbon ring, or a substituted or unsubstituted heterocycle, p: an integer of 1 or 2, q: an integer of 1 or 2, General Formula (7)

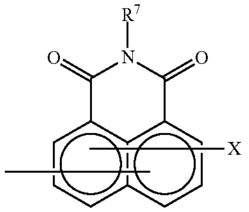

where X is —OH, —$N(R^1)(R^2)$, or —$NHSO_2$—$R^3$, in which $R^1$ and $R^2$ are each independently a hydrogen atom, or a substituted or unsubstituted alkyl group, and $R^3$ is a substituted or unsubstituted alkyl group, or a substituted or unsubstituted aryl group; and $R^7$ is a substituted or unsubstituted hydrocarbon group, General Formula (8)

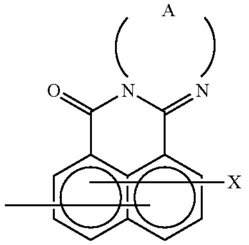

where X is —OH, —$N(R^1)(R^2)$, or —$NHSO_2$—$R^3$, in which $R^1$ and $R^2$ are each independently a hydrogen atom, or a substituted or unsubstituted alkyl group, and $R^3$ is a substituted or unsubstituted alkyl group, or a substituted or unsubstituted aryl group; and A is a hetero atom-containing bivalent group containing either a bivalent aromatic hydrocarbon group or a nitrogen atom, which is necessary for forming a nitrogen-containing heterocycle together with the two nitrogen atoms presented in the formula (8), where the aromatic ring of the bivalent aromatic hydrocarbon group and the heterocycle may be substituted or unsubstituted, General Formula (9)

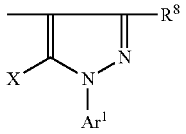

where X is —OH, —$N(R^1)(R^2)$, or —$NHSO_2$—$R^3$, in which $R^1$ and $R^2$ are each independently a hydrogen atom, or a substituted or unsubstituted alkyl group, and $R^3$ is a substituted or unsubstituted alkyl group, or a substituted or unsubstituted aryl group; $R^8$ is an alkyl group, a carbamoyl group, a carboxyl group, or ester thereof; and $Ar^1$ is a substituted or unsubstituted hydrocarbon cyclic group, General Formula (10)

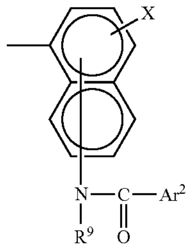

General Formula (11)

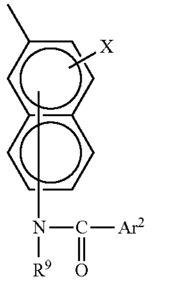

where, in the general formulae (10) and (11), X is —OH, —$N(R^1)(R^2)$, or —$NHSO_2$—$R^3$, in which $R^1$ and $R^2$ are each independently a hydrogen atom, or a substituted or unsubstituted alkyl group, and $R^3$ is a substituted or unsubstituted alkyl group, or a substituted or unsubstituted aryl group; $R^9$ is a hydrogen atom, or a substituted or unsubstituted hydrocarbon group; and $Ar^2$ is a substituted or unsubstituted hydrocarbon cyclic group, provided that there is no case where $Ar^2$ is a cycloalkyl group, or a cycloalkenyl group with $R^9$ being a hydrogen atom.

<5> The hydroxygallium phthalocyanine composite pigment according to any of <3> or <4>, wherein the principal skeleton B contained in the azo compound expressed by the general formula (2) is expressed by the following general formula (12);

General Formula (12)

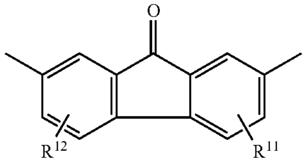

where $R^{11}$ and $R^{12}$ are each independently a hydrogen atom, a halogen atom, a substituted or unsubstituted alkyl group, a substituted or unsubstituted alkoxy group, a carboxyl group, or an ester thereof.

<6> The hydroxygallium phthalocyanine composite pigment according to any of <3> or <4>, wherein the principal skeleton B contained in the azo compound expressed by the general formula (2) is expressed by the following general formula (13):

General Formula (13)

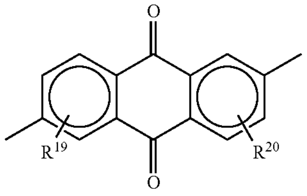

where $R^{19}$ and $R^{20}$ are each independently a hydrogen atom, a halogen atom, a substituted or unsubstituted alkyl group, a substituted or unsubstituted alkoxy group, a carboxyl group, or an ester thereof.

<7> An electrophotographic photoconductor, containing:

a conductive support; and a photosensitive layer disposed on the conductive support, and containing the hydroxygallium phthalocyanine composite pigment as defined in any one of <1> to <6>.

<8> An image forming device, containing:

a charging unit;

an exposing unit;

a developing unit;

a transferring unit; and the electrophotographic photoconductor as defined in <7>.

<9> The image forming device according to <8>, wherein the electrophotographic photoconductor and at least one selected from the group consisting of the charging unit, the exposing unit, the developing unit, transferring unit, and a cleaning unit are integratedly formed into a cartridge, and the cartridge is detachably mounted to a body of the image forming device.

<10> A process cartridge for an image forming device, containing:

the electrophotographic photoconductor as defined in <7>; and at least one selected from the group consisting of a charging unit, an exposing unit, a developing unit, a transferring unit, and a cleaning unit, which is integratedly formed into a cartridge with the electrophotographic photoconductor.

By using the hydroxygallium phthalocyanine composite pigment of the present invention in a photosensitive layer of an electrophotographic photoconductor, an electrophotographic photoconductor and an image forming device both capable of outputting high quality prints for a long period of time without causing image failures can be provided.

Here, the hydroxygallium phthalocyanine composite pigment of the present invention is a pigment formed by conjugating the azo compound expressed by the general formula (a) onto the surface of a hydroxygallium phthalocyanine pigment to form the hydroxygallium phthalocyanine composite pigment of the present, and having diffraction peaks at least at 7.5°, 9.9°, 12.5°, 16.3°, 18.6°, 25.1°, and 28.3° on an X-ray diffraction spectrum with Bragg angle of 2θ±0.2°, using Cu—Kα X-rays. Moreover, the hydroxygallium phthalocyanine composite pigment of the present invention is the one prepared by dissolving at least one azo compound expressed by the general formula (I) in an organic solvent in the presence of a hydroxygallium phthalocyanine pigment, and allowing to proceed de-carboesterification while the azo compound and the hydroxygallium phthalocyanine pigment are allowed to be in contact with each other at molecular level. According to this method, the soluble azo compound expressed by the general formula (I) is dispersed on the surface of the hydroxygallium phthalocyanine pigment at molecular level, and formed into a pigment, i.e. the azo compound expressed by the general formula (a), on the surface of the hydroxygallium phthalocyanine pigment, so that the azo pigment is conjugated onto the surface of the hydroxygallium phthalocyanine pigment at molecular level to thereby create a minute composite form. Other phthalocyanine pigments can also be used, but the hydroxygallium phthalocyanine pigment particularly exhibits a significant effect, which cannot be seem with other phthalocyanine pigments. The reason why the hydroxygallium phthalocyanine pigment exhibits more significant effect than other phthalocyanine pigments is not certain, but it is assumed that, as the hydroxygallium phthalocyanine pigment has higher hydrogen binding ability than other phthalocyanine pigments, it has high affinity to the azo compound for use in the present invention, and forms the stronger composite form. Moreover, use of an electron-donating azo compound provides a particularly significant effect in the present invention.

The following are the superior characteristics of the present invention compared to other techniques.

The hydroxygallium phthalocyanine pigment easily provides a desirable crystal shape thereof, even when it is conjugated to the azo compound, and has high crystallinity. For example, in the case where an electron-donating material or other phthalocyanines are mixed to and conjugated to the hydroxygallium phthalocyanine when the hydroxygallium phthalocyanine is crystallized, it is often a case that the crystallinity of the hydroxygallium phthalocyanine may be lowered, or the desirable crystal shape thereof may not be obtained, as the mixed materials disturb the generation of crystals.

Moreover, as the composite form is created at molecular level, the effect resulted from the composite can be attained to the maximum. There are countless of techniques for mixing a plurality of pigments while milling, as the method for compositing and mixing, but these techniques merely provide mixing of different pigment particles and do not form a sufficient conjugated state. In addition, there is a technique for conjugating a soluble electron-donating material onto a surface of a phthalocyanine pigment to form a conjugation at molecular level. However, this technique has a problem that the electron-donating material is dissolved out when a coating liquid is prepared by dispersing the resulting conjugated pigment. In the present invention, on the other hand, as a soluble azo compound is formed into a pigment on a surface of a hydroxygallium phthalocyanine pigment, the aforementioned problem of dissolving out is not caused, and an effect from the conjugation can be expected even after a charge-generating layer is formed.

As mentioned above, use of the hydroxygallium phthalocyanine composite pigment of the present invention solves the various problems in the art, and as a result, provides an electrophotographic photoconductor having high sensitivity, and extremely stable electric potential over time regardless of the environment at the time of use, and an image forming device having excellent stability in image quality.

According to present invention, the various problems in the art can be solved, and the aforementioned objects can be achieved. Moreover, the present invention provides a hydroxygallium phthalocyanine composite pigment, which is a novel charge-generating material, capable of providing high quality prints for a long period of time without causing any image failure by suppressing accumulation of electric charge, which is caused by the charge-generating material, and capable of outputting images of stable image quality under any environmental condition, as well as providing an electrophotographic photoconductor, an image forming device, and a process cartridge for an image forming device, using such material.

Figure 1:
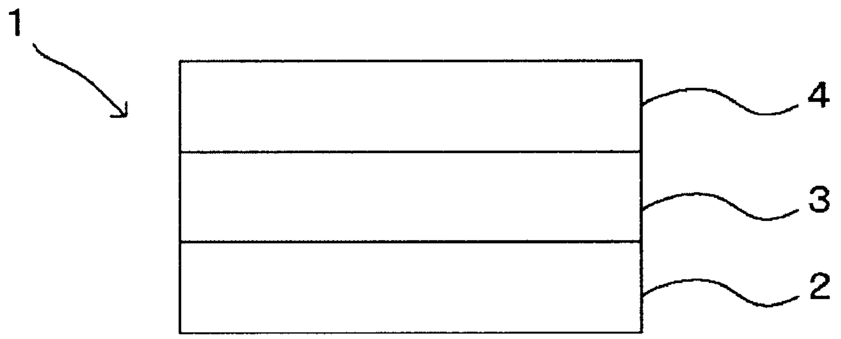
FIG. 1 is a schematic diagram showing one example of the layer structure of the electrophotographic photoconductor of the present invention.

DETAILED DESCRIPTION OF THE INVENTION (Hydroxygallium Phthalocyanine Composite Pigment)

The hydroxygallium phthalocyanine composite pigment of the present invention is the one obtained by allowing a hydroxygallium phthalocyanine pigment to be present aside when the azo compound having a carboester group, which is expressed by the general formula (I), is dissolved and dicarboesterificated to form the azo compound expressed by the general formula (a).

$A(E)_n$ General Formula (I)

In the general formula (I), where A is a residue of the azo compound, which is bonded to the number of the E groups via one or more hetero atoms, in which the number of the E groups is represented by n, the hetero atoms are selected from the group consisting of N and O and constitute part of the residue A; E groups are each independently selected from the group consisting of H (a hydrogen atom) and a carboester group expressed by: —C(═O)—O—$R^0$ where $R^0$ is a C4-10 substituted or unsubstituted alkyl group, a C4-10 substituted or unsubstituted alkenyl group, a C4-10 substituted or unsubstituted alkynyl group, a C4-10 substituted or unsubstituted cycloalkyl group, a C4-10 substituted or unsubstituted cycloalkenyl group, or a C4-10 substituted or unsubstituted aralkyl group, provided that there is no case where all of the E groups are hydrogen atoms at the same time; and n is an integer of 1 to 9.

$A(H)_n$ General Formula (a)

In the general formula (a), A is identical to that in the general formula (I), H is a hydrogen atom, and n is an integer of 1 to 9.

More specifically speaking, the targeted hydroxygallium phthalocyanine composite pigment can be produced by heating the azo compound and the hydroxygallium phthalocyanine pigment in an organic solvent so as to allow them to cause decarboesterification.

The hydroxygallium phthalocyanine pigment for use may be those having low crystallinity and subjected to an acid paste treatment, or those of V-type crystals subjected to a milling treatment or the like with N,N-dimethylformamide.

The mass ratio of the hydroxygallium phthalocyanine pigment to the azo compound is suitably selected depending on the intended purpose. Considering one of the objects of the invention that is to further emphasize the characteristics of the hydroxygallium phthalocyanine pigment in the resulting composite pigment, the suitable amount of the azo compound is 0.1 parts by mass to 300 parts by mass relative to 100 parts by mass of the hydroxygallium phthalocyanine pigment. When the amount of the azo compound is less than 0.1 parts by mass, the effect of the composite is not clearly exhibited. When the amount of the azo compound is more than 300 parts by mass, the characteristics of the hydroxygallium phthalocyanine pigment may not be sufficiently exhibited.

A reaction for turning the azo compound into a decarboesterified azo pigment is suitably a reaction initiated by heating. The temperature of the pyrogenetic reaction is preferably 70° C. to 300° C., more preferably 120° C. to 250° C. When the temperature is lower than 70° C., the reaction may not be progressed sufficiently. When the temperature is higher than 300° C., the crystal shapes of the hydroxygallium phthalocyanine composite pigment may be adversely affected by the heat.

Although the chemical method using an acidic material has been known, it is not suitable for the present invention because it is known that the hydroxygallium phthalocyanine pigment may be reacted, or the crystal shape thereof may be changed.

The organic solvent for use is suitably selected depending on the intended purpose without any restriction, provided that it dissolves the azo compound during the pyrogenetic reaction. Examples of such organic solvent include tetrahydrofuran, dioxane, ethylene glycol methyl ether, ethylene glycol ethyl ether, N,N-dimethylformamide, N,N-dimethylacetoamide, dimethylsulfoxide, ethyl cellosolve, ethyl acetate, methyl acetate, dichloroethane, monochlorobenzene, toluene, xylene, nitrobenzene, pyridine, picoline, and quinoline. These may be used independently, or in combination. Among them, N,N-dimethylformamide, N,N-dimethylacetoamide, and dimethylsulfoxide are preferable.

<Azo Compound>

The azo compound suitably used for the present invention is the azo compound expressed by the general formulae (a) and (I), and having the residue A expressed by the general formula (2).

$B—(N=N\text{-}Cp)_m$ General Formula (2)

In the general formula (2), B is a principle skeleton of an azo compound, Cp is a residue of a coupler component, and m is an integer of 2 or 3.

In addition, Cp of the general formula (2) is preferably the coupler component residue expressed by at least one of the following general formulae (3) to (11).

General Formula (3)

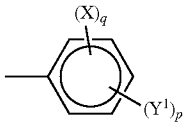

General Formula (4)

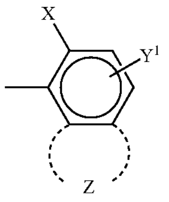

General Formula (5)

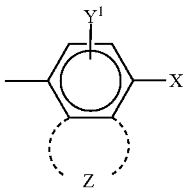

General Formula (6)

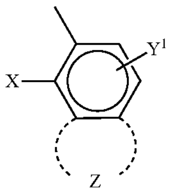

In the general formulae (3) to (6), X, $Y^1$, Z, p and q each denote those listed below.

X: —OH, —$N(R^1)(R^2)$, or —$NHSO_2$—$R^3$ (In the above, $R^1$ and $R^2$ are each independently a hydrogen atom, or a substituted or unsubstituted alkyl group, and $R^3$ is a substituted or unsubstituted alkyl group, or a substituted or unsubstituted aryl group.)

$Y^1$: a hydrogen atom, a halogen atom, a substituted or unsubstituted alkyl group, a substituted or unsubstituted alkoxy group, a carboxyl group, a sulfone group, a substituted or unsubstituted sulfamoyl group, or —$CON(R^4)(Y^2)$, ($R^4$ is a hydrogen atom, a substituted or unsubstituted alkyl group, or a substituted or unsubstituted phenyl group; $Y^2$ is a substituted or unsubstituted hydrocarbon cyclic group, a substituted or unsubstituted heterocyclic group, or —$N=C(R^5)(R^6)$, in which $R^5$ is a substituted or unsubstituted hydrocarbon cyclic group, a substituted or unsubstituted heterocyclic group, or a substituted or unsubstituted styryl group, $R^6$ is a hydrogen atom, a substituted or unsubstituted alkyl group, a substituted or unsubstituted phenyl group, or $R^5$ and $R^6$ may form a ring with carbon atoms bonded to $R^5$ and $R^6$).

Z: a substituted or unsubstituted hydrocarbon ring, or a substituted or unsubstituted heterocycle, p: an integer of 1 or 2, q: an integer of 1 or 2.

General Formula (7)

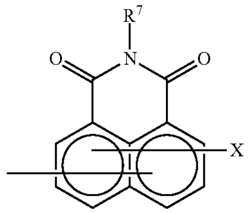

In the general formula (7), X is —OH, —$N(R^1)(R^2)$, or —$NHSO_2$—$R^3$, in which $R^1$ and $R^2$ are each independently a hydrogen atom, or a substituted or unsubstituted alkyl group, and $R^3$ is a substituted or unsubstituted alkyl group, or a substituted or unsubstituted aryl group; and $R^7$ is a substituted or unsubstituted hydrocarbon group.

General Formula (8)

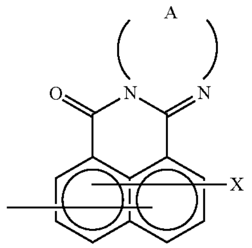

In the general formula (8), X is —OH, —$N(R^1)(R^2)$, or —$NHSO_2$—$R^3$, in which $R^1$ and $R^2$ are each independently a hydrogen atom, or a substituted or unsubstituted alkyl group, and $R^3$ is a substituted or unsubstituted alkyl group, or a substituted or unsubstituted aryl group; and A is a hetero atom-containing bivalent group containing either a bivalent aromatic hydrocarbon group or a nitrogen atom, which is necessary for forming a nitrogen-containing heterocycle together with the two nitrogen atoms presented in the formula (8), where the aromatic ring of the bivalent aromatic hydrocarbon group and the heterocycle may be substituted or unsubstituted.

General Formula (9)

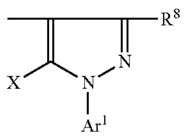

In the general formula (9), X is —OH, —$N(R^1)(R^2)$, or —$NHSO_2$—$R^3$, in which $R^1$ and $R^2$ are each independently a hydrogen atom, or a substituted or unsubstituted alkyl group, and $R^3$ is a substituted or unsubstituted alkyl group, or a substituted or unsubstituted aryl group; $R^8$ is an alkyl group, a carbamoyl group, a carboxy group, or ester thereof; and $Ar^1$ is a substituted or unsubstituted hydrocarbon cyclic group.

General Formula (10)

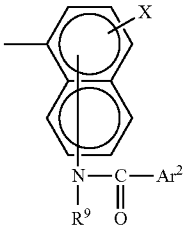

General Formula (11)

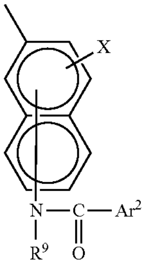

In the general formulae (10) and (11), X is —OH, —N($R^1$)($R^2$), or —$NHSO_2$—$R^3$, in which $R^1$ and $R^2$ are each independently a hydrogen atom, or a substituted or unsubstituted alkyl group, and $R^3$ is a substituted or unsubstituted alkyl group, or a substituted or unsubstituted aryl group; $R^9$ is a hydrogen atom, or a substituted or unsubstituted hydrocarbon group; and $Ar^2$ is a substituted or unsubstituted hydrocarbon cyclic group, provided that there is no case where $Ar^2$ is a cycloalkyl group, or a cycloalkenyl group with $R^9$ being a hydrogen atom.

Moreover, it is preferred that the azo compound expressed by the general formula (2) contain the principal skeleton B expressed by any of the following general formulae (12) to (13). These azo compounds generally exhibit characteristics of n-type, and thus it is very effective for attaining expected effects of the invention, when these are composited with a hydroxygallium phthalocyanine pigment.

General Formula (12)

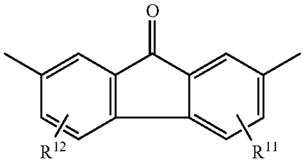

In the formula (12), $R^{11}$ and $R^{12}$ are each independently a hydrogen atom, a halogen atom, a substituted or unsubstituted alkyl group, a substituted or unsubstituted alkoxy group, a carboxyl group, or ester thereof.

General Formula (13)

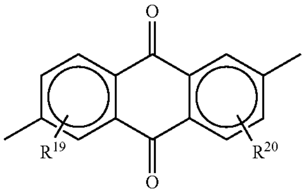

In the formula (13), $R^{19}$ and $R^{20}$ are each independently a hydrogen atom, a halogen atom, a substituted or unsubstituted alkyl group, a substituted or unsubstituted alkoxy group, a carboxyl group or ester thereof.

<Other Examples of Azo Compound>

Other examples of the azo compound are as follows:

(1) Azo compound including the principal skeleton B having the following structure:

General Formula (17)

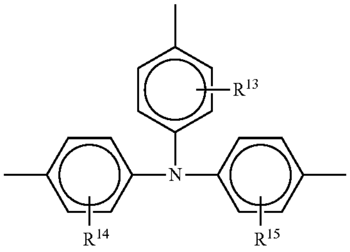

In the general formula (17), $R^{13}$, $R^{14}$, and $R^{15}$ are each independently a hydrogen atom, a halogen atom, a substituted or unsubstituted alkyl group, a substituted or unsubstituted alkoxy group, a carboxyl group, or ester thereof.

For example, the azo compound having the structure below is one of the examples of such azo compound.

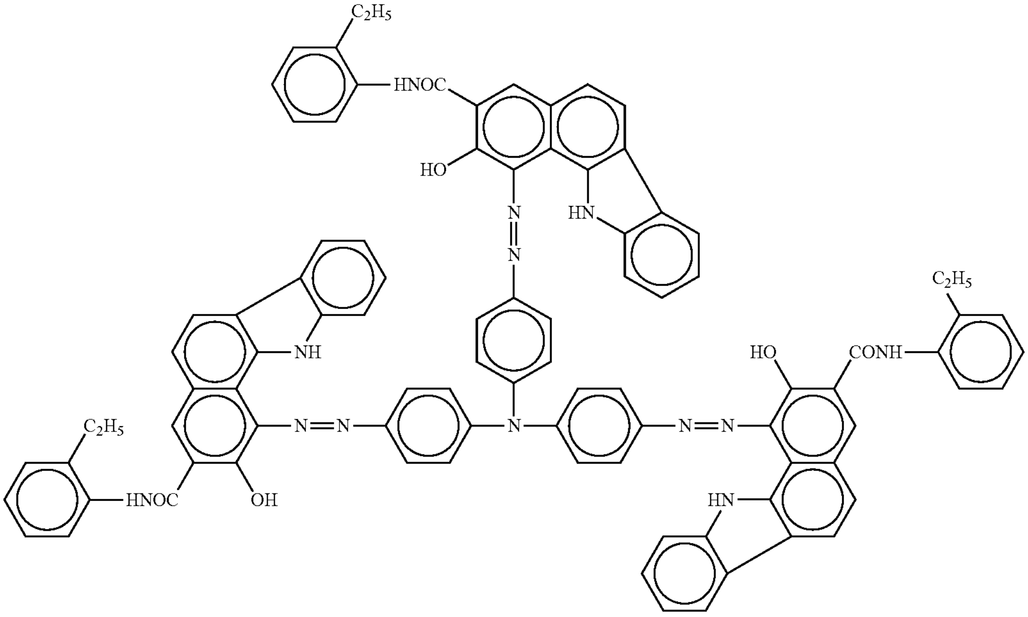

(2) Azo compound including the principal skeleton B having the following structure:

General Formula (18)

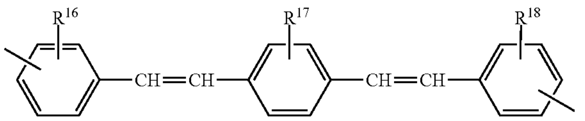

In the general formula (18) $R^{16}$, $R^{17}$, and $R^{18}$ are each independently a hydrogen atom, a halogen atom, a substituted or unsubstituted alkyl group, a substituted or unsubstituted alkoxy group, a carboxyl group, or ester thereof.

For example, the azo compound having the structure below is one of the examples of such azo compound.

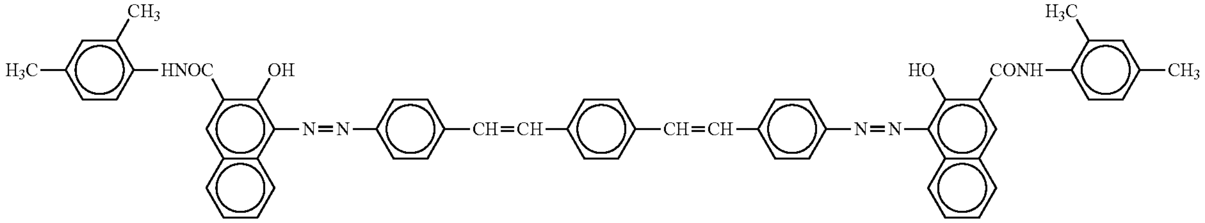

Preferable examples of the azo compound expressed by the general formulae (a) and (I) for use in the present invention include the azo compounds expressed by the following formulae (12)-1 to (12)-14 in which the principal skeleton of the azo compound is expressed by the general formula (12), and the azo compounds expressed by (13)-1 to (13)-5 in which the principal skeleton of the azo compound is expressed by the general formula (13).

Examples of the compound are shown below. In the formulae below, E is a hydrogen atom or a carboester group (—C(═O)—O—$R^1$) where $R^1$ is a C4-10 substituted or unsubstituted alkyl group, a C4-10 substituted or unsubstituted alkenyl group, a C4-10 substituted or unsubstituted alkynyl group, a C4-10 substituted or unsubstituted cycloalkyl group, a C4-10 substituted or unsubstituted cycloalkenyl group, or a C4-10 substituted or unsubstituted aralkyl group.

<Examples of the Compound where the Principal Skeleton of the Azo Compound is Expressed by General Formula (12)>

(12-1)

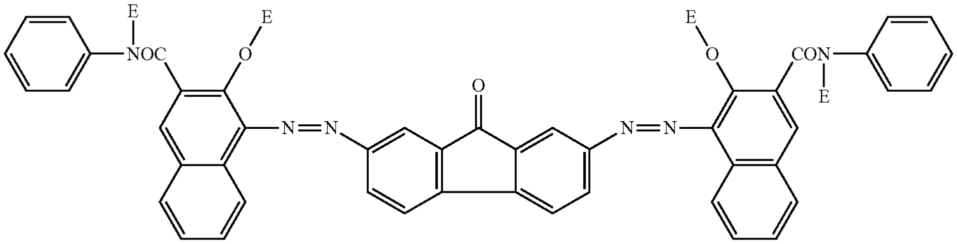

(12-2)

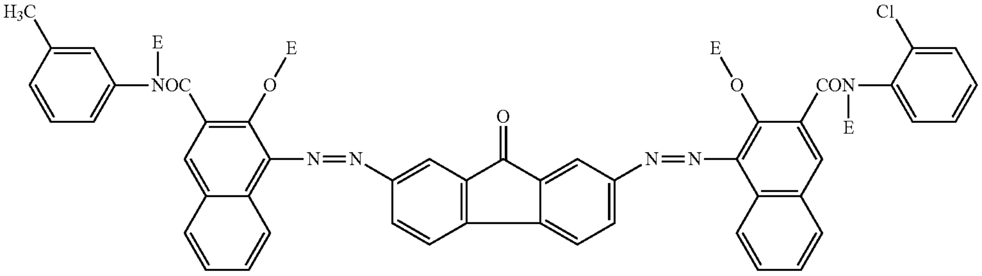

-continued
(12-3)
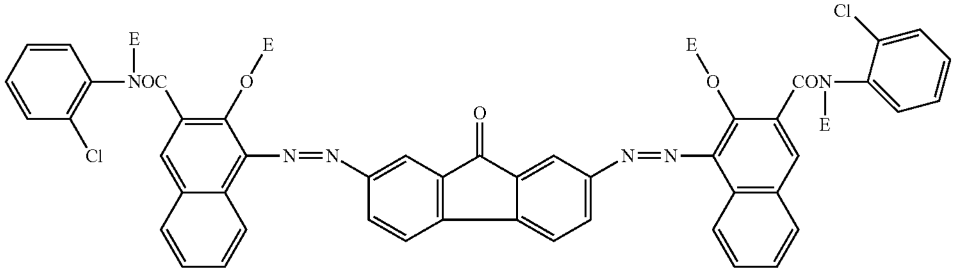
(12-4)
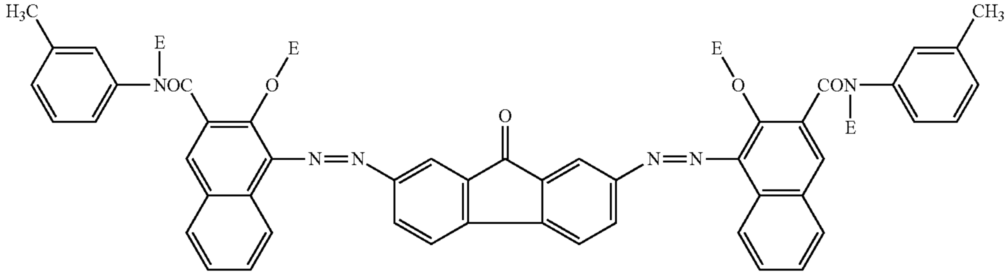
(12-5)
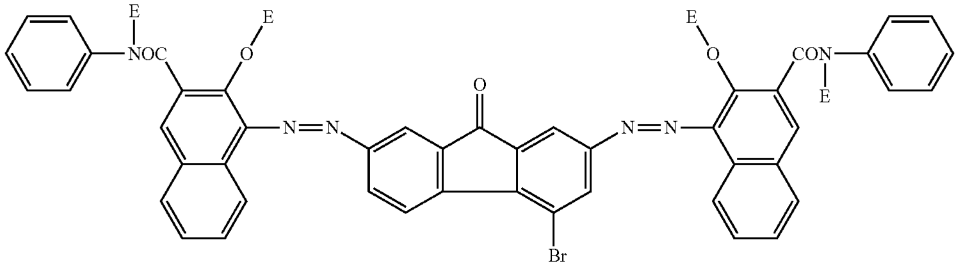
(12-6)
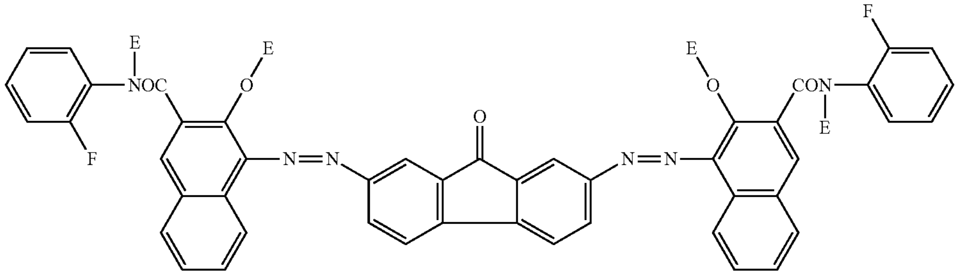
(12-7)
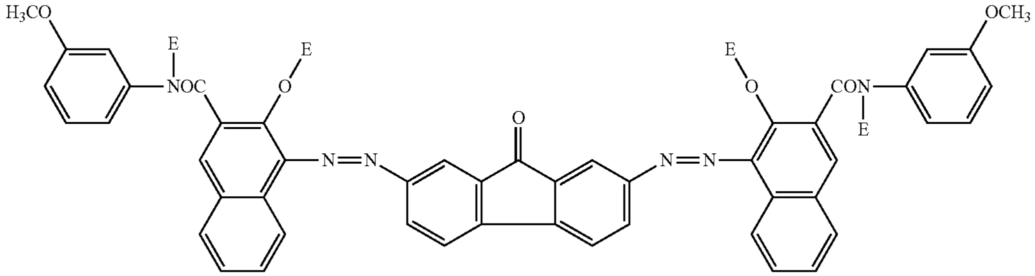
(12-8)
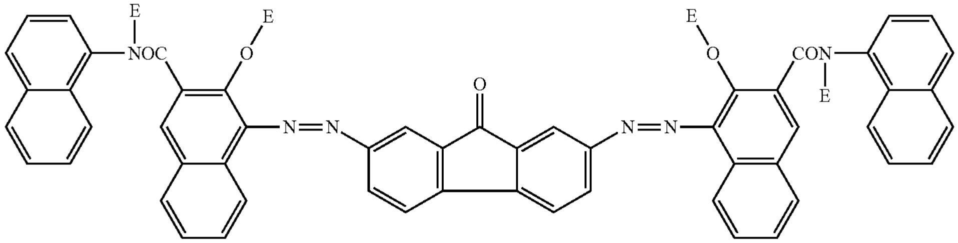

-continued
(12-9)
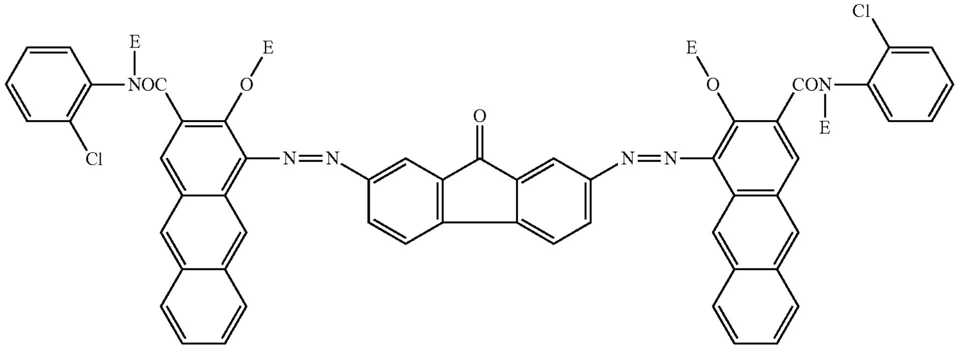
(12-10)
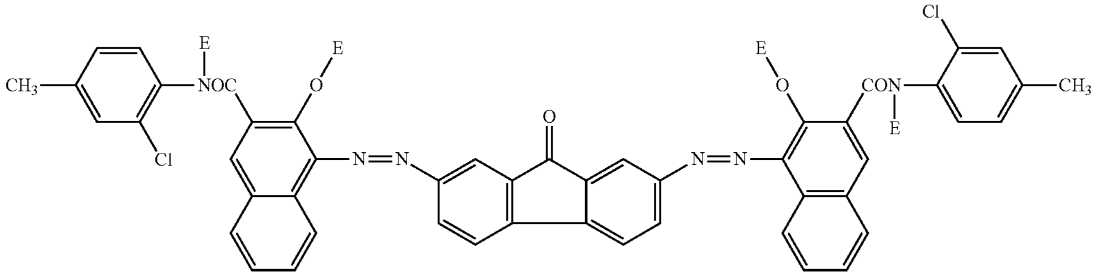
(12-11)
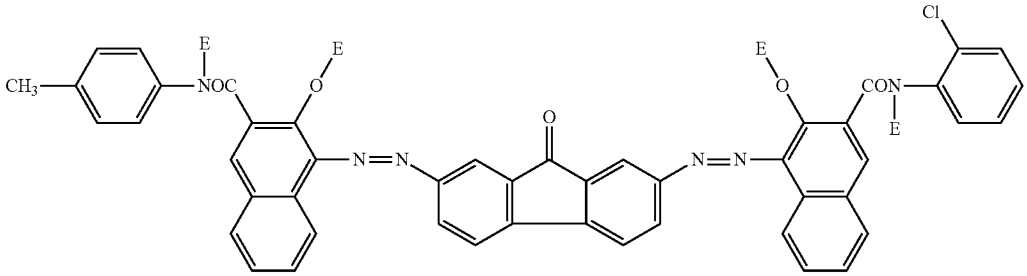
(12-12)
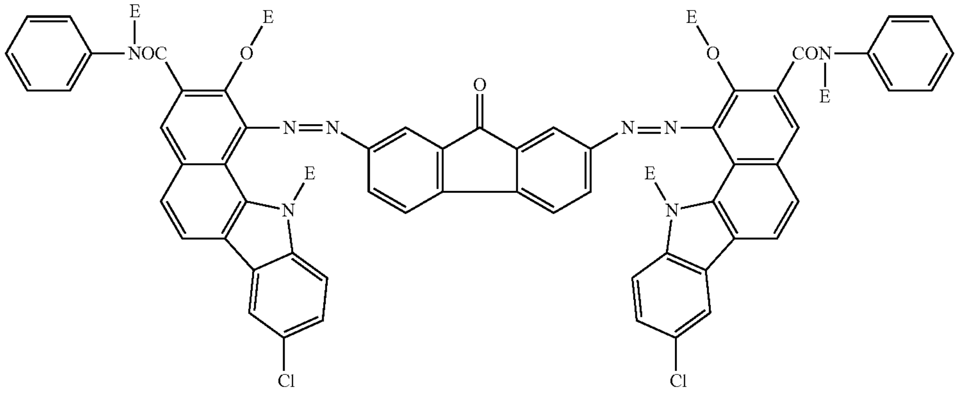

-continued
(12-13)
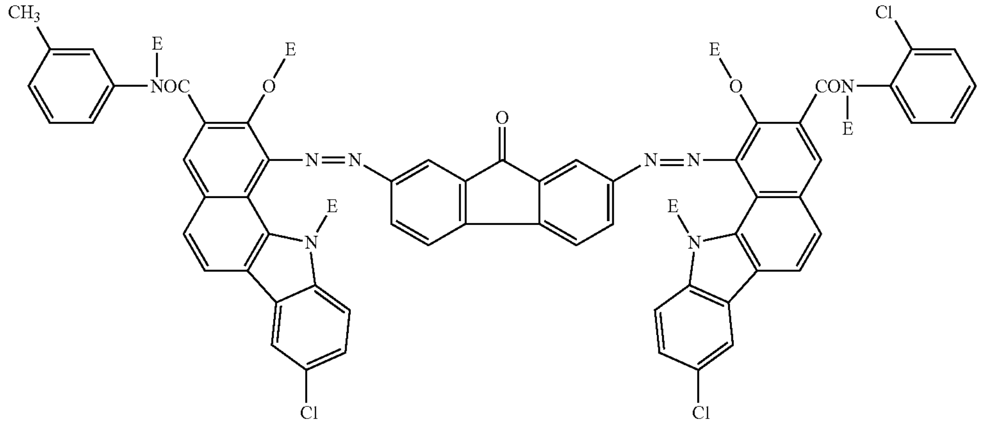
(12-14)
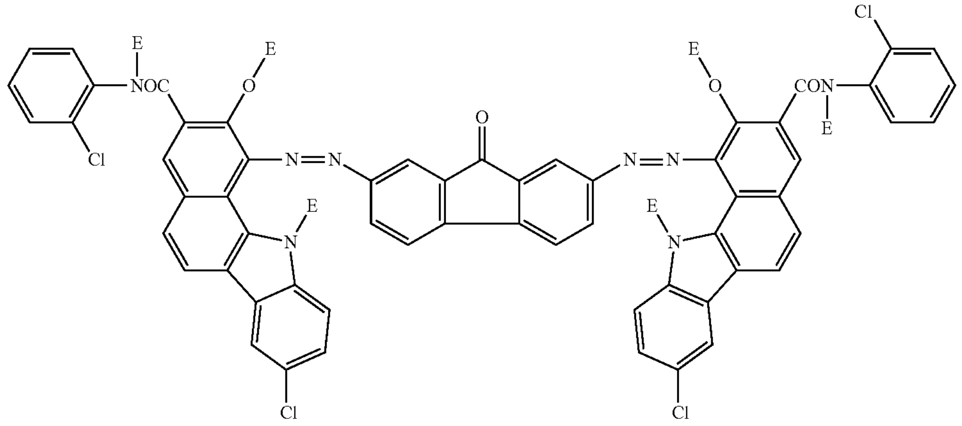
<Examples of the Compound where the Principle Skeleton of the Azo Compound is Expressed by General Formula (13)>
(13-1)
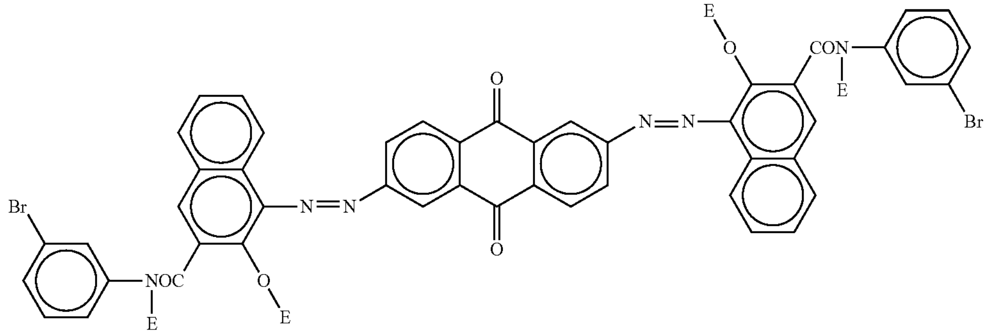

-continued
(13-2)
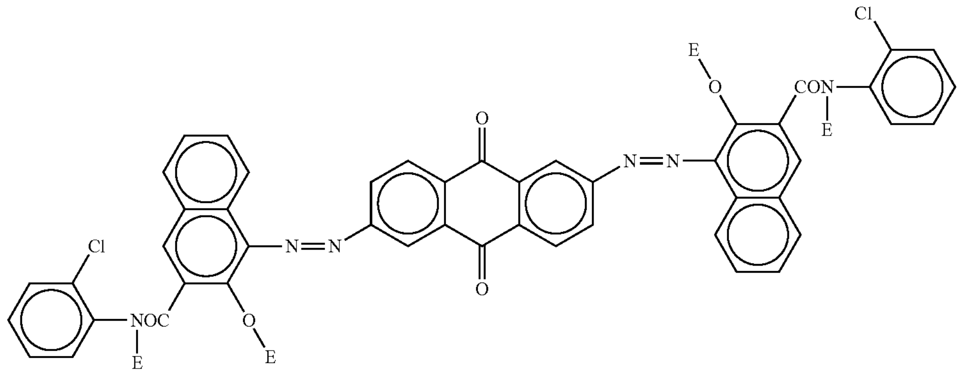
(13-3)
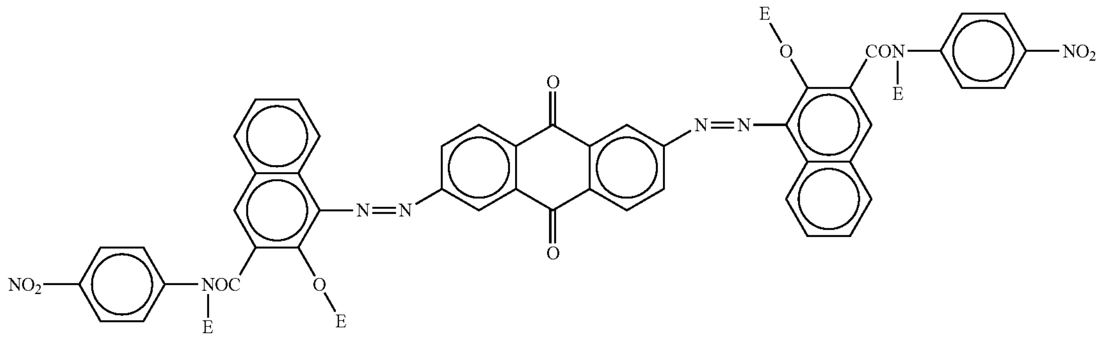
(13-4)
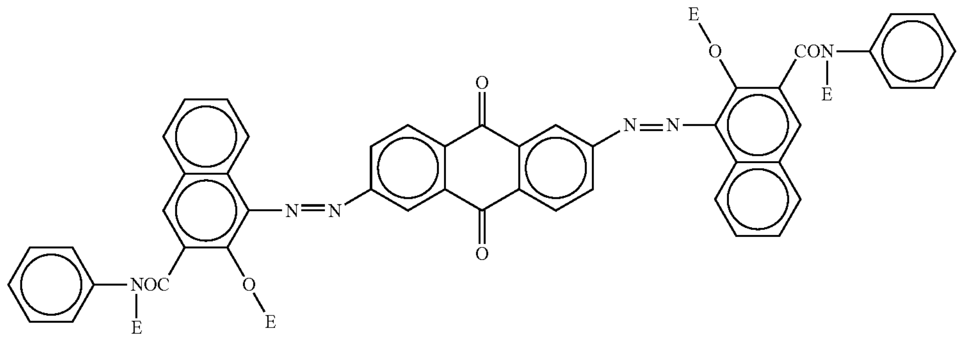
(13-5)
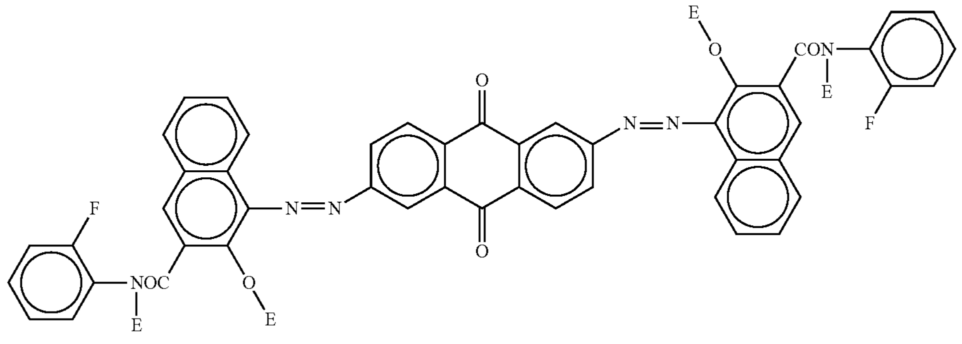

The azo compound expressed by the general formula (I) having the carboester group is, for example, synthesized by the methods described in European Patent Nos. 648770 and 648817, and Japanese Patent Application Publication (JP-A) No. 2001-513119. For example, it can be synthesized by reacting the compound expressed by the general formula (2) and the pyro carbonic acid diester expressed by the following formula (14), at an appropriate molar ratio, in an aprotic organic solvent under the presence of a base serving as a catalyst, at the temperature of 0° C. to 150° C., preferably 10° C. to 100° C., for 30 minutes to 20 hours.

General Formula (14)

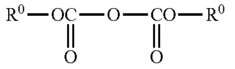

In the compound expressed by the general formula (2), B and Cp are each those as explained earlier. In the formula (14), $R_0$ is as mentioned in the description of the aforementioned General Formula (I).

In each case, the molar ratio is affected by the number of the carboester groups to be introduced. It is preferred that the pyro carbonic acid diester is used in a slightly excessive amount.

Examples of the appropriate aprotic organic solvent for use include: ether solvents such as tetrahydrofuran, and dioxane; glycol ether solvents such as ethylene glycol methyl ether, and ethylene glycol ethyl ether; and others such as acetonitril, N,N-dimethylformamide, N,N-dimethylacetoamide, ethyl cellosolve, ethyl acetate, methyl acetate, dichloromethane, dichloroethane, monochlorobenzene, toluene, xylene, nitrobenzene, pyridine, picoline, and quinoline. Among them, pyridine, tetrahydrofuran, N,N-dimethylformamide, and N,N-dimethylacetoamide are preferable.

Examples of the base suitable for the catalyst include: alkali metals such as sodium and potassium; hydroxides and carbonates of alkali metals; alkali metal amide such as sodium amide and potassium amide; and hydrogenated alkali metals such as lithium hydride.

Other examples of the base include organic N-bases such as organic aliphatic N-bases, aromatic N-bases, and heterocyclic N-bases. Examples of the organic N-bases include diazabicyclooctene, diazabicycloundecene, 4-dimethylaminopyridine, dimethylpyridine, pyridine, and triethyl amine. Among them, 4-dimethylaminopyridine, dimethylpyridine, and pyridine are preferable.

The pyrocarbonic acid diester expressed by the formula (14) shown above can be produced by any commonly known method, and can also be obtained as commercial products. $R^0$ denotes those shown above, but is preferably a blanched alkyl group as the result significantly increases the solubility thereof.

(Electrophotographic Photoconductor)

The electrophotographic photoconductor (may also be referred to as a photoconductor, hereinafter) of the present invention contains a conductive support, and at least a photosensitive layer provided on the conductive support, where the photosensitive layer contains at least the aforementioned hydroxygallium phthalocyanine composite pigment.

Next, the photoconductor of the present invention will be explained with reference to drawings hereinafter.

Figure 2:
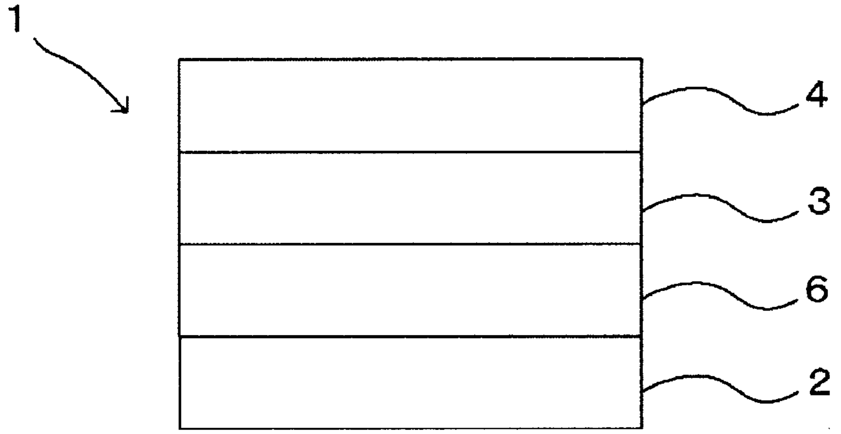
FIG. 2 is a schematic diagram showing another example of the layer structure of the electrophotographic photoconductor of the present invention.

As shown in FIG. 1, the photoconductor (1) of the present invention include a charge-generating layer (3) mainly formed of a charge-generating material, and a charge-transporting layer (4) mainly formed of a charge-transporting material, and a conductive support (2), and the charge-generating layer (3) and the charge-transporting layer (4) are laminated on the conductive support (2). Moreover, the photoconductor (1) of the present invention may have an undercoat layer (6) or an intermediate layer provided between the conductive support (2) and the charge-generating layer (3) as shown in FIG. 2.

Figure 3:
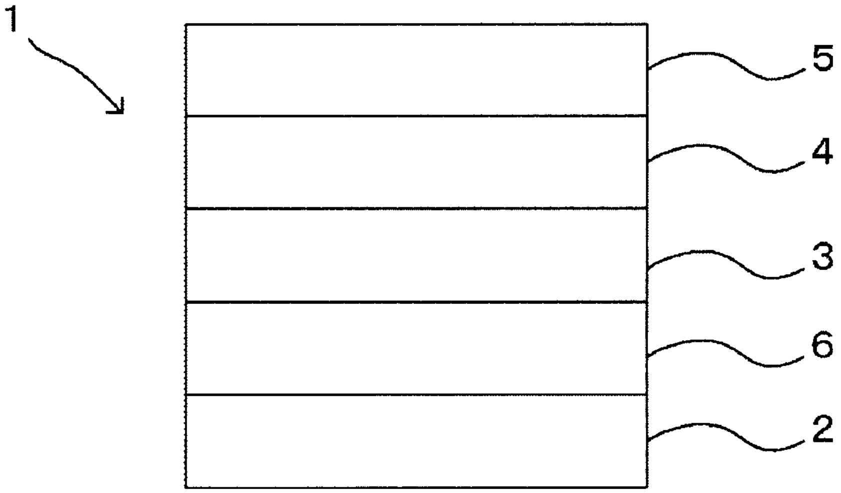
FIG. 3 is a schematic diagram showing another example of the layer structure of the electrophotographic photoconductor of the present invention.

Furthermore, the photoconductor (1) of the present invention may have a protective layer (5) provided on the charge-transporting layer (4) as shown in FIG. 3.

Figure 4:
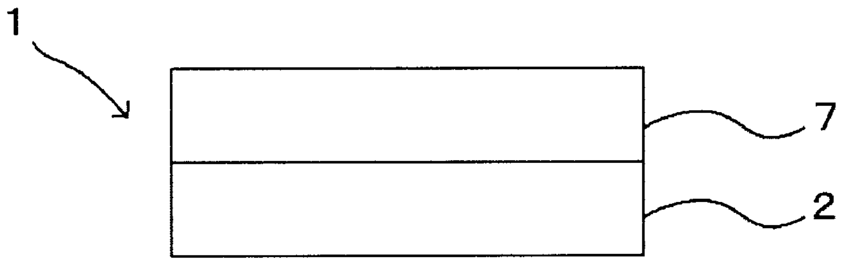
FIG. 4 is a schematic diagram showing another example of the layer structure of the electrophotographic photoconductor of the present invention.

The photoconductor (1) of the present invention may be an embodiment of a single-layer photoconductor in which a single photosensitive layer (7) containing the charge-generating material and the charge-transporting material is provided on the conductive support (2), as shown in FIG. 4.

<Conductive Support>

The conductive support is suitably selected depending on the intended purpose without any restriction, provided that it has a conductivity of $10^{10}\Omega\cdot cm$ or less based on the volume resistivity. Examples of the conductive support include: a film-shaped or cylindrical plastic or paper coated with a metal (e.g. aluminum, nickel, chromium, nichrome, copper, gold, silver, platinum) or a metal oxide (e.g. tin oxide, indium oxide) by vacuum deposition or sputtering; and a tube which is formed by forming a tube one or more plates of aluminum, aluminum alloy, nickel, stainless steel into a tube by extrusion, or drawing out, then subjecting the tube to surface treatment such as cutting, super-finishing, and polishing. Moreover, an endless nickel belt, and an endless stainless steel belt can be also used as the conductive support.

Other than the above, those formed by coating a conductive powder, which is dispersed in an appropriate binder resin, onto the aforementioned support can also be used as the conductive support for used in the present invention.

Examples of the conductive powder include: conductive carbon-based powder such as carbon black and acetylene black; metal powder such as aluminum, nickel, iron, nichrome, copper, zinc, and silver; and metal oxide powder such as conductive tin oxide, and ITO.

Examples of the binder resin used together with the conductive powder include thermoplastic resins, thermoset resins, and photocurable resins, and specific examples thereof include polystyrene, styrene-acrylonitrile copolymers, styrene-butadiene copolymers, styrene-maleic anhydride copolymers, polyester, polyvinyl chloride, vinyl chloride-vinyl acetate copolymers, polyvinyl acetate, polyvinylidene chloride, polyacrylate resins, phenoxy resins, polycarbonate, cellulose acetate resins, ethyl cellulose resins, polyvinyl butyral, polyvinyl formal, polyvinyl toluene, poly-N-vinyl carbazole, acrylic resins, silicone resins, epoxy resins, melamine resins, urethane resins, phenol resins, and alkyd resins.

Such conductive layer can be provided by coating a coating liquid prepared by dispersing these conductive powder and binder resin in an appropriate solvent such as tetrahydrofuran, dichloromethane, methylethyl ketone, and toluene.

Moreover, as the conductive support for use in the present invention, those providing a conductive layer on an appropriate cylindrical support using a thermal shrinkable tube in which the aforementioned conductive powder is added to a material such as polyvinyl chloride, polypropylene, polyester, polystyrene, polyvinylidene chloride, polyethylene, chlorinated rubber, and polytetrafluoroethylene-based fluororesin may be also suitably used.

<Photosensitive Layer>

The photosensitive layer will be explained next.

The photosensitive layer may be a photosensitive layer having a laminate structure in which at least a charge-generating layer and a charge-transporting layer are laminated, or a single-layered photosensitive layer containing a charge-generating material and a charge-transporting material. The laminate structure of the photosensitive layer will be explained hereinafter.

<Charge-Generating Layer>

The charge-generating layer is a layer containing a charge-generating material. The charge-generating layer contains at least the hydroxygallium phthalocyanine composite pigment of the present invention as the charge-generating material.

As the charge-generating material, the hydroxygallium phthalocyanine composite pigment of the present invention and the conventional charge-generating material may be used in mixture. Examples of the conventional charge-generating material include: azo pigments such as monoazo pigments, diazo pigments, asymmetric disazo pigments, and trisazo pigments; phthalocyanine-based pigments such as titanyl phthalocyanine, copper phthalocyanine, vanadyl phthalocyanine, hydroxygallium phthalocyanine, and non-metal phthalocyanine; and others such as perylene-based pigments, perynone-based pigments, indigo pigments, pyrrolo-pyrrole pigments, anthraquinone pigments, quinacridon-based pigments, quinine-based condensed polycyclic compounds, and squarylium pigments.

Examples of the binder resin for use in the charge-generating layer include polyamide, polyurethane, epoxy resins, polyketone, polycarbonate, silicone resins, acrylic resins, polyvinyl butyral, polyvinyl formal, polyvinyl ketone, polystyrene, polysulfone, poly-N-vinyl carbazole, polyacryl amide, polyvinyl benzal, polyester, phenoxy resins, vinyl chloride-vinyl acetate copolymers, polyvinyl acetate, polyphenylene oxide, polyamide, polyvinyl pyridine, cellulose-based resins, casein, polyvinyl alcohol, and polyvinyl pyrrolidone. The amount of the binder resin is preferably 0 part by mass to 500 parts by mass, more preferably 10 parts by mass to 300 parts by mass, relative to 100 parts by mass of the charge-generating material.

The charge-generating layer is formed in the following manner. At first, the charge-generating material is dispersed in an appropriate solvent, optionally with the binder resin, by the conventional dispersing method such as using a ball-mill, an attritor, a sand-mill or ultrasonic waves, and then the resulting dispersion liquid is applied onto the conductive support, or on the undercoat layer or intermediate layer. The coated dispersion liquid is then dried to form the charge-generating layer. The addition of the binder resin may be performed either before or after the dispersion of the charge-generating material.

Examples of the solvent used for forming the charge-generating layer include commonly used organic solvents such as isopropanol, acetone, methylethyl ketone, cyclohexanone, tetrahydrofuran, dioxane, ethyl cellsolve, ethyl acetate, methyl acetate, dichloromethane, dichloroethane, monochlorobenzene, cyclohexane, toluene, xylene, and ligroin. Among them, the ketone solvent, ester solvent, and ether solvent are particularly preferable. These may be used independently, or in combination.

The coating liquid for forming the charge-generating layer contains the charge-generating material, the solvent, and the binder resin as main components, and may further contain various additives such as a sensitizing agent, a dispersing agent, a surfactant, and silicone oil.

Examples of the method for applying the coating liquid of the charge-generating layer include conventional methods such as dip coating, spray coating, bead coating, nozzle coating, spinner coating, and ring coating.

The thickness of the coated charge-generating layer is preferably 0.01 μm to 5 μm, more preferably 0.1 μm to 2 μm. After the coating, the coated film is heat dried, for example, in an oven. The drying temperature of the charge-generating layer is preferably 50° C. to 160° C.

<Charge-Transporting Layer>

The charge-transporting layer will be explained next.

The charge-transporting layer is formed by applying a coating liquid, which has been prepared by dissolving or dispersing the charge-transporting material and the binder resin in the solvent, and drying the applied coating. The coating liquid of the charge-transporting layer may optionally further contain additives such as one or more plasticizers, leveling agents, antioxidants, and lubricants.

Examples of the charge-transporting material includes poly(N-vinylcarbazole) and derivatives thereof, poly(γ-carbazolylethyl glutamate) and derivatives thereof, a pyrene-formaldehyde condensate and derivatives thereof, polyvinyl pyrene, polyvinyl phenanthrene, polysilane, oxazole derivatives, oxadiazole derivatives, imidazole derivatives, monoarylamine derivatives, diarylamine derivatives, triarylamine derivatives, stilbene derivatives, α-phenyl stilbene derivatives, amino biphenyl derivatives, benzidine derivatives, diarylmethane derivatives, triarylmethane derivatives, 9-styrylanthracene derivatives, pyrazoline derivatives, divinylbenzene derivatives, hydrazone derivatives, indene derivatives, butadiene derivatives, pyrene derivatives, bisstilbene derivatives, distyrylbenzene derivatives, and enamine derivatives. These charge-transporting materials may be used independently or in combination.

The amount of the charge-transporting material for use is generally 20 parts by mass to 300 parts by mass, and preferably 40 parts by mass to 150 parts by mass, relative to 100 parts by mass of the binder resin.

Examples of the binder resin include thermoplastic or thermoset resins such as polystyrene, styrene-acrylonitrile copolymers, styrene-butadiene copolymers, styrene-maleic anhydride copolymers, polyester, polyvinyl chloride, vinyl chloride-vinyl acetate copolymers, polyvinyl acetate, polyvinylidene chloride, polyacrylate, phenoxy resins, polycarbonate, cellulose acetate resins, ethyl cellulose resins, polyvinyl butyral, polyvinyl formal, polyvinyl toluene, poly(N-vinylcarbazole), acrylic resins, silicone resins, epoxy resins, melamine resins, urethane resins, phenol resins, and alkyd resins.

Examples of the solvent used for coating include tetrahydrofuran, dioxane, toluene, cyclohexanone, methylethyl ketone, xylene, acetone, diethyl ether, and methylethyl ketone. These may be used independently, or in combination.

The thickness of the coated charge-transporting layer is preferably 10 μm to 50 μm, more preferably 15 μm to 35 μm, in view of the obtainable dissolution and response.

The method for coating can be selected from those known in the art, such as dip coating, spray coating, bead-coating, nozzle coating, spinner coating, and ring-coating. However, since the charge-transporting layer needs to be formed to have a relatively large thickness, the method in which the highly viscose coating liquid is coated by dip coating is preferable.

After the coating, the coated film (i.e. the charge-transporting layer) is heat dried, for example, in an oven. The drying temperature may be varied depending on the solvent contained in the coating liquid, but it is preferably 80° C. to 160°

C., more preferably 110° C. to 140° C. Moreover, the duration for drying is preferably 10 minutes or longer, more preferably 20 minutes or longer.

<Single Layer>

Next, the photosensitive layer having a single-layered structure will be explained.

The photoconductor having such photosensitive layer is a photoconductor having a single layer, which has both functions of charge generation and charge transport, by dispersing or dissolving the charge-generating material, and the charge-transporting material in the binder resin.

The photosensitive layer can be formed by dissolving or dispersing the charge-generating material, the charge-transporting material, and the binder resin in a solvent (e.g. tetrahydrofuran, dioxane, dichloroethane, methylethyl ketone, cyclohexane, cyclohexanone, toluene, and xylene), and applying the resulting coating liquid by the conventional coating method such as dip coating, spray coating, bead-coating, and ring-coating.

The charge-transporting material preferably contains both a hole-transporting material and an electron-transporting material.

Moreover, the photosensitive layer optionally contains a plasticizer, a leveling agent, an antioxidant, etc.

The charge-generating material, the charge-transporting material, the binder resin, the organic solvent, and various additive used for the single-layered photosensitive layer can be selected any of the respective materials contained in the charge-generating layer and the charge-transporting layer.

As the binder resin, those listed as the binder resin used for the charge-transporting layer may be used in mixture with those listed as the binder resin used for the charge-generating layer. The amount of the charge-generating material is preferably 5 parts by mass to 40 parts by mass, more preferably 10 parts by mass to 30 parts by mass relative to 100 parts by mass of the binder resin.

Moreover, the amount of the charge-transporting material is preferably 0 part by mass to 190 parts by mass, more preferably 50 parts by mass to 150 parts by mass relative to 100 parts by mass of the binder resin. The thickness of the photosensitive layer is preferably 5 μm to 40 μm, more preferably 10 μm to 30 μm.

<Undercoat Layer>

The photoconductor of the present invention may have an undercoat layer provided between the conductive support and the photosensitive layer.

The undercoat layer generally contains a resin as a main substance. Such resin is preferably a resin having high resistance to common organic solvent, as the photosensitive layer will be provided (i.e. coated) on the undercoat layer using a solvent. Examples of such resin for use include: water-soluble resins such as polyvinyl alcohol, casein, polyacrylic acid sodium; alcohol-soluble resins such as copolymer nylon, and methoxymethylated nylon; and curable resins capable of forming three-dimensional network structures, such as polyurethane, melamine resins, phenol resins, alkyd-melamine resins, isocyanate, and epoxy resins.

Moreover, the undercoat layer may contain a powdery pigment of metal oxide such as titanium oxide, silica, alumina, zirconium oxide, tin oxide, and indium oxide for preventing formations of interference fringes, and reducing residual potential.

Moreover, the undercoat layer can be formed by the same coating methods using the same solvents as in the charge-generating layer and the charge-transporting layer. As the undercoat layer, a silane-coupling agent, a titanium-coupling agent, a chromium-coupling agent or the like can be used.

<Protective Layer>

The photoconductor of the present invention may have a protective layer provided on the outermost surface for improving abrasion resistance of the photoconductor. As the protective layer, a protective layer of a charge-transporting polymer material in which a charge-transporting component and a binder component are polymerized, a filler-dispersed protective layer in which filler is added, and a cured protective layer which has been cured have been known in the art. In the present invention, any of the protective layers known in the art can be used.

(Image Forming Device)

An image forming device of the present invention contains a charging unit, an exposing unit, a developing unit, a transferring unit, and an electrophotographic photoconductor, where the electrophotographic photoconductor is the electrophotographic photoconductor of the invention.

Moreover, the image forming device of the present invention preferably contains a main body of the device, and a process cartridge in which the electrophotographic photoconductor and at least one selected from the group consisting of a charging unit, an exposing unit, a developing unit, a transferring unit, and a cleaning unit are integratedly mounted, and the process cartridge is preferably detachably attached to the main body of the device.

Next, the electrophotographic method, and the image forming device of the present invention will be more specifically explained with reference to drawings.

Figure 5:
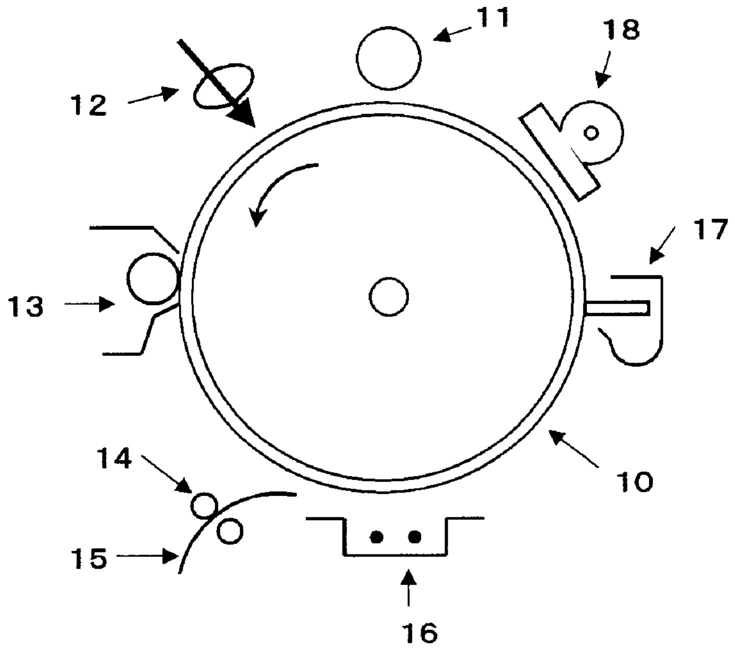
FIG. 5 is a schematic diagram for explaining one example of the electrophotographic process, and one example of the image forming device of the present invention.

FIG. 5 is a schematic diagram for explaining one example of the electrophotographic process, and image forming device of the present invention, and the following embodiment is within the scope of the present invention.

The photoconductor (10) is rotated in the direction shown with the arrow presented in FIG. 5, and adjacent to the photoconductor (10), a charging unit (11), an imagewise exposing unit (12), a developing unit (13), a transferring unit (16), a cleaning unit (17), a diselectrification unit (18) and the like are provided. There are cases where the cleaning unit (17) and/or the diselectrification unit (18) are omitted from the image forming device.

Basic operations of the image forming device are as follows.

The surface of the photoconductor (10) is uniformly charged by means of the charging unit (11), followed by performing imagewise writing corresponding to an input signal by means of the imagewise exposing unit (12) to thereby form an electrostatic latent image. Then, this electrostatic latent image is developed by means of the developing unit (13) to thereby form a toner image on the surface of the photoconductor. The formed toner image is then transferred to a transferring paper (15), which has been sent to the transferring section by conveyance rollers (14), by means of the transferring unit. This toner image is fixed on the transferring paper by means of the fixing device (not shown). The residual toner, which has not been transferred to the transferring paper, is cleaned by the cleaning unit (17). Then, the residual potential on the photoconductor is diselectrificated by means of the diselectrification unit (18) to thereby move on to a next cycle.

As shown in FIG. 5, the photoconductor (10) has a drum shape, but the photoconductor may be in the shape of a sheet, or an endless belt. As the charging unit (11), and the transferring unit (16), other than a corotron, scorotron, and a solid state charger, a roller-shaped charging unit, a brush-shaped charging unit, and the like are used, and any of the conventional charging units can be used.

As the light sources of the imagewise exposing unit (12), the diselectrification unit (18), and the like, all luminous bodies such as fluorescent lamps, tungsten lamps, halogen lamps, mercury lamps, sodium lamps, light emitting diode (LED), laser diode (LD) (i.e. a semiconductor laser), and electroluminescence (EL) can be used. Among them, the laser diode (LD) and the light emitting diode (LED) are mainly used.

Various filters may be used for applying only the light having the predetermined wavelength, and such examples of the filters include a sharp-cut filter, a band-pass filter, a near IR-cut filter, a dichroic filter, an interference filter, and a color conversion filter.

Light is applied to the photoconductor (10) by the transferring step, diselectrifying step, cleaning step or exposing step, which also perform light irradiation. However, the application of light to the photoconductor (10) in the diselectrifying step largely gives fatigue to the photoconductor (10), especially which may reduce the charge, or increase residual potential.

Therefore, it is possible to diselectrify the photoconductor by applying reverse bias in the charging step or cleaning step, not by applying light, and such method for diselectrification may be advantageous for improving the resistance of the photoconductor.

When the electrophotographic photoconductor (10) is positively (negatively) charged to perform imagewise exposure, the positive (negative) electrostatic latent image is formed on the surface of the photoconductor. If this electro-latent image is developed with a toner (voltage detecting particles) of negative polarity (positive polarity), a positive image is obtained. If the image is developed with a toner of positive polarity (negative polarity), a negative image is obtained.

Methods known in the art are used for the operations of the developing unit and the diselectrifying unit.

Among the polluting materials attached to the surface of the photoconductor, discharge materials generated by charging, external additives contained the toner, and the like are easily influenced by humidity, and are factor for causing formation of deficient images. Paper powder is also one of the factors for formation of deficient images, the attachment of the paper powder to the photoconductor causes not only formations of deficient images, but also deterioration of abrasion resistance, and partial abrasions. Therefore, the configuration that the photoconductor and the paper are not in contact with each other directly is preferable for improving the quality of the resulting images.

The toner used for developing the image on the photoconductor (10) by means of the developing unit (13) is transferred to the transferring paper (15). However, all of the toner present on the photoconductor is not transferred, and some of the toner may remain on the photoconductor (10). Such residual toner is removed from the photoconductor (10) by the cleaning unit (17).

As the cleaning unit, those known in the art, such as a cleaning blade and a cleaning brush are used. The cleaning blade and the cleaning brush are often used in combination.

Since the photoconductor of the present invention has high photosensitivity and high stability, it can be applied for a small-diameter photoconductor. The image forming device or its system to which such photoconductor is more effectively applied is a tandem image forming device. The tandem image forming device is equipped with a plurality of photoconductors each corresponding to respective developing units each containing a toner of respective color, and these photoconductors and the developing units are operated so as to synchronize to each other. To the tandem image forming device, at least four color toners, yellow (C), magenta (M), cyan (C), and black (K), which are necessary for full color printing, and developing units containing these toners are provided, as well as at least four photoconductors corresponding to these developing units. Having such configuration, such image forming device can realize extremely high speed printing, compared with the printing speed of conventional image forming device for full color printing.

Figure 6:
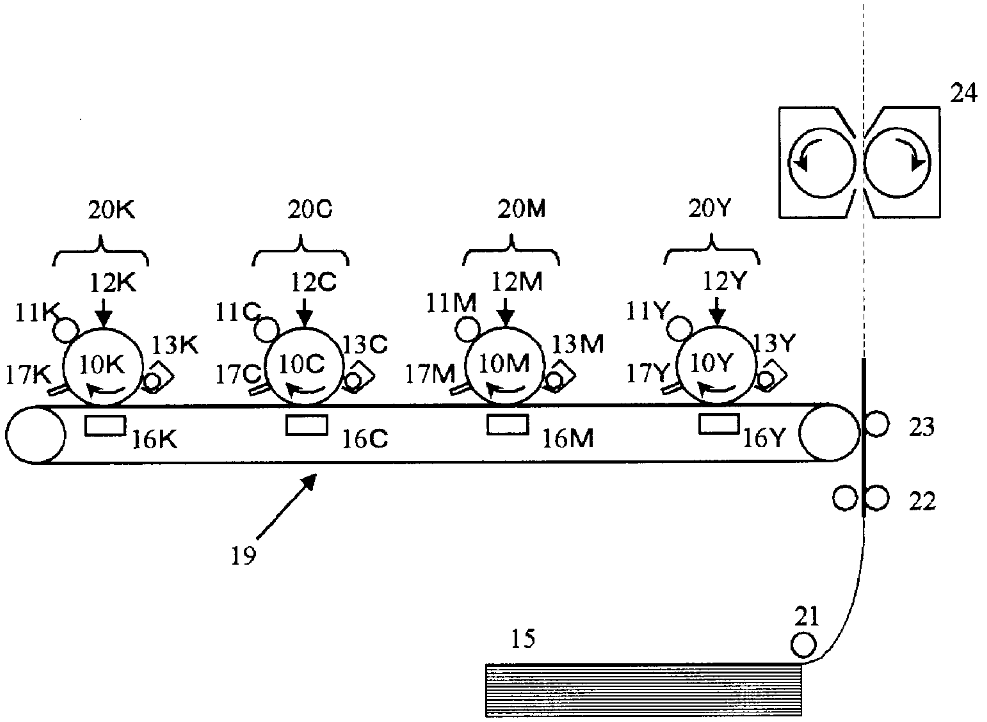
FIG. 6 is a schematic diagram for explaining another example of the electrophotographic process, and another example of the image forming device of the present invention.

FIG. 6 is a schematic diagram for explaining the full color tandem electrophotographic device (the image forming device) according to the present invention, and the example of the modification explained below is also within the scope of the present invention.

In FIG. 6, the photoconductors (10C (cyan)), (10M (magenta)), (10Y (yellow)), and (10K (black)) are each a drum-shaped photoconductor (10), and these photoconductors (10C, 10M, 10Y, and 10K) are each rotated in the direction shown with the arrow in the diagram. The adjacent to each photoconductor, at least a respective charging unit (11C, 11M, 11Y, or 11K), developing unit (13C, 13M, 13Y, or 13K), and cleaning unit (17C, 17M, 17Y, or 17K) are provided in the rotational order.

Laser light (12C, 12M, 12Y, and 12K) is applied to the photoconductors (10C, 10M, 10Y, and 10K) from the exposing units each present between the charging units (11C, 11M, 11Y, and 11K and the developing unit (13C, 13M, 13Y, and 13K), respectively, to form electrostatic latent images on the photoconductors (10C, 10M, 10Y, and 10K), respectively.

Four image forming elements (20C, 20M, 20Y, and 20K), each of which is configured to have such photoconductor (10C, 10M, 10Y, or 10K) in center, are aligned parallel to the transferring conveyance belt (19) serving as a transferring material conveying unit.

The transferring conveyance belt (19) is provided so as to be in contact with the sections of the photoconductors (10C, 10M, 10Y, and 10K) each of which is provided in the section between the developing unit (13C, 13M, 13Y, or 13K) of each image forming element (20C, 20M, 20Y, or 20K) and the cleaning unit (17C, 17M, 17Y, or 17K), and transferring units (16C, 16M, 16Y, and 16K) for applying transferring bias are provided on the other side (the back surface) of the transferring conveyance belt (19) to the side where the photoconductors (10) are provided. The difference between the image forming elements (20C, 20M, 20Y, and 20K) is color of the toner housed in the developing unit, and other configurations are the same in the all image forming elements.

The image forming operations of the color electrophotographic device having the configurations as shown in FIG. 6 are performed in the following manner. At first, in each image forming element (20C, 20M, 20Y, or 20K), the photoconductor (10C, 10M, 10Y, or 10K) is charged by the charging unit (11C, 11M, 11Y, or 11K) which is rotated in the same direction to the rotational direction of the photoconductor 10, and electrostatic latent images, each of which is corresponded to the respective color of the image to be formed, are formed by laser light (12C, 12M, 12Y, 12K) applied from the exposing unit (not shown) provided at outer side of the photoconductor (10).

Next, the formed electrostatic latent images are developed with the developing units (13C, 13M, 13Y, and 13K) to form toner images. The developing units (13C, 13M, 13Y, and 13K) are developing units each perform developing the toner of C (cyan), M (magenta), Y (yellow), or K (black), and the toner images each having a single color of C (cyan), M (magenta), Y (yellow), or K (black) respectively formed on the four photoconductors (10C, 10M, 10Y, and 10K) are superimposed on the transferring belt (19).

The transferring paper (15) is fed from the tray by means of the feeding roller (21), and then temporarily stopped by a pair of registration rollers (22) so that the transferring paper (15) is sent to the transferring unit (23) so as to meet the timing to the image formation on the photoconductor. The toner image held on the transferring belt (19) is transferred to the transferring paper (15) by the electric field generated by the potential difference between the transferring bias applied to the transferring unit (23) and the transferring belt (19). The toner image transferred onto the transferring paper (15) is conveyed and fixed thereon by the fixing member (24), and the transferring paper bearing the fixed image is then discharged to the discharging unit (not shown). The residual toner remained on the photoconductors (10C, 10M, 10Y, and 10K) without being transferred by the transferring unit is collected by the cleaning units (17C, 17M, 17Y, and 17K) each provided in the respective image forming element.

The intermediate transferring system as shown in FIG. 6 is particularly effective for an image forming device capable of full color printing. In this system, as a plurality of toner images are formed on an intermediate transferring member first, and then transferred to paper at the same time, it is easy to control and prevent dislocations of colors, and is advantageous for attaining high quality images. As the intermediate transferring member, intermediate transferring members of various materials and shapes, such as a drum shape and a belt shape are available. In the present invention, any of the conventional intermediate transferring members known in the art can be used, and use thereof is effective and useful for improving the durability of the photoconductor and improving the quality of the resulting images.

Note that, in the example shown with the diagram of FIG. 6, the image forming elements are aligned in the order of C (cyan), M (magenta), Y (yellow), and K (black) from the upstream to downstream in terms of the transferring paper conveying direction. However, the arrangement of the image forming elements are not necessarily limited to this order, and the order of the colors can be appropriately arranged. Moreover, it is particularly effective for the present invention to provide a mechanism that the image forming elements (20C, 20M, and 20Y) other than that of black is stopped when documents in the color of only black are formed.

The image forming unit (image forming element) as described above may be fixed and incorporated in copying devices, facsimiles, and printers, or may be incorporated therein in the form of a process cartridge.

The process cartridge for an image forming device of the present invention contains an electrophotographic photoconductor, and at least one selected from the group consisting of a charging unit, an exposing unit, a developing unit, a transferring unit, and a cleaning unit, where the electrophotographic photoconductor and the aforementioned at least one member are integrated to form the process cartridge, and the electrophotographic photoconductor is the electrophotographic photoconductor of the present invention.

Figure 7:
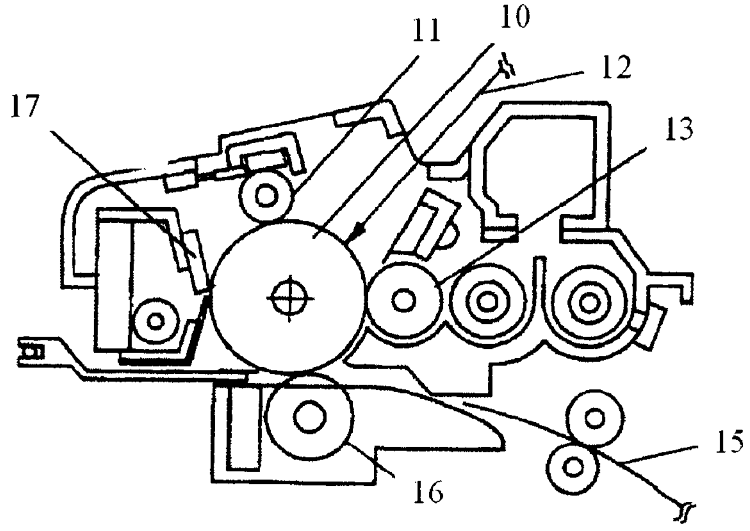
FIG. 7 is a schematic diagram for explaining one example of the process cartridge for an image forming device of the present invention.

The process cartridge is, for example, a device (a component) equipped with the photoconductor (10), and containing, other than the photoconductor (10), the charging unit (11), imagewise exposing unit (12), developing unit (13), transferring unit (16), cleaning unit (17), and diselectrification unit, as shown in FIG. 7.

The aforementioned tandem image forming device can realize high speed full color printing because it can transfer a plurality of toner images at once.

However, the conventional tandem image forming device still has many problems to be solved. For example, the tandem image forming device requires at least four photoconductors, and thus the size of the device naturally becomes large. In addition, if the amount of each toner used is varied, each photoconductor has a different amount of abrasion depending on the amount of the toner used, which may reduce color reproduction ability, or may form deficient images.

Comparing to the above, the photoconductor of the present invention can be applied as a small diameter photoconductor because the photoconductor of the present invention realizes high photosensitivity and high stability. Since the photoconductor of the present invention reduces adverse phenomena such as increased residual potential and deterioration of sensitivity, the difference formed in the residual potential or sensitivity among the four photoconductors over time is small even though the abrasion amounts of the four photoconductors are different to each other, and thus full color images having excellent color reproduction ability can be attained after repetitive use for a long period of time.

EXAMPLES

Examples of the present invention will be explained hereinafter, but these examples shall not be construed as limiting the scope of the present invention.

Comparative Synthesis Example 1

Synthesis of Hydroxygallium Phthalocyanine Pigment 1

To 200 mL of dehydrated dimethylsulfoxide, 30 parts by mass of 1,3-diiminoisoindoline, and 8 parts by mass of gallium trichloride were added, the mixture was allowed to react for 12 hours under flow of Ar at 150° C., and then the generated chlorogallium phthalocyanine was separated by filtration. After washing the resulting wet cake with methylethyl ketone and N,N-dimethylformamide, the washed wet cake was dried to thereby yield 22 parts by mass (70.3% by mass) of chlorogallium phthalocyanine crystals. The obtained chlorogallium phthalocyanine (5 parts by mass) was made dissolved in 150 parts by mass of ice-cold concentrated sulfuric acid, and this sulfuric acid solution was gradually dropped in 500 mL of ice-cold ion-exchanged water to thereby precipitate crystals of hydroxygallium phthalocyanine. After separating the crystals by filteration, the wet cake was washed with 500 mL of 2% by mass ammonium water, followed by sufficiently washing with ion-exchanged water. Thereafter, the washed wet cake was dried to thereby yield 4.6 parts by mass of Hydroxygallium Phthalocyanine Pigment 1.

Comparative Synthesis Example 2

Synthesis of Hydroxygallium Phthalocyanine Pigment 2

To a 50-mL sample glass bottle, 0.5 parts by mass of Hydroxygallium Phthalocyanine Pigment 1 and 15 mL of N,N-dimethylformamide were added together with 45 parts by mass of glass beads (diameter: about 1 mm), the mixture was milled for 24 hours, and the crystals thus obtained were separated by filtration. To the obtained crystals, 100 mL of 2-butanone was added, and the mixture was stirred for 2 hours at room temperature, followed by separating the crystals by filtration. The same operation was performed twice using about 100 mL of ion-exchanged water, and the resultant was then dried to thereby obtain Hydroxygallium Phthalocyanine Pigment 2.

Figure 8:
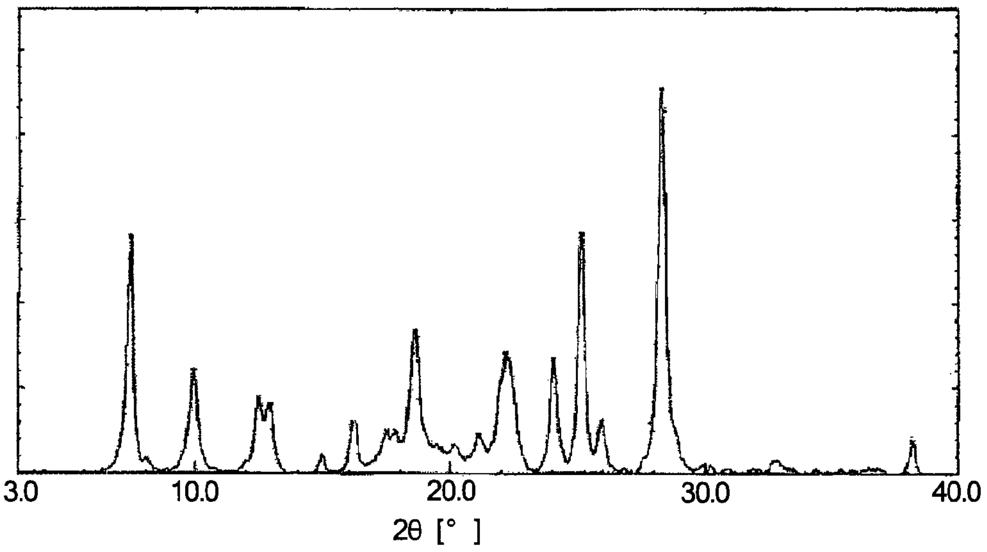
FIG. 8 is a graph showing the powder X-ray diffraction spectrum of Comparative Synthesis Example 2.

The powder X-ray diffraction spectrum of Hydroxygallium Phthalocyanine Pigment 2 is shown in FIG. 8.

Synthesis Example of Hydroxygallium Phthalocyanine Composite Pigment

Synthesis Example 1

Preparation of Hydroxygallium Phthalocyanine Composite Pigment 1 of Hydroxygallium Phthalocyanine Pigment And Azo Pigment ((12)-3)(E=H)

To 100 mL of N,N-dimethylformamide, 0.92 parts by mass of the azo compound (the azo compound expressed by the above-presented formula (12)-3, E:$C_5H_9O_2$) which had been prepared in the method described in Example 1 of JP-A No. 2009-7523, and 0.90 parts by mass of Hydroxygallium Phthalocyanine Pigment 1 were added and the mixture was allowed to react for 7 hours under return current, while strongly stirring. After confirming the disappearance of the azo compound ((12)-3) by thin layer chromatography, the temperature of the mixture was returned to room temperature, and filtered through a fluoropore having a pore diameter of 0.1 μm.

To the obtained crystals, 100 mL of N,N-dimethylformamide was added, and the mixture was stirred for 2 hours at room temperature, followed by removing the crystals by filtration. This operation was performed one more time, and the same operation was repeated again, provided that the solvent was changed to 2-butanone. Moreover, the same operation was carried out twice with about 100 mL of ion-exchanged water, followed by drying to thereby obtain 1.42 parts by mass (93% by mass) of Hydroxygallium Phthalocyanine Composite Pigment 1.

It was confirmed that the absorption derived from saturated hydrocarbon (2980 $cm^{-1}$) of the azo compound and the absorption based on the stretching vibration of C═O of the carbonate (1760 $cm^{-1}$) were disappeared on the IR absorption spectrum (the KBr pellet technique) of Hydroxygallium Phthalocyanine Composite Pigment 1.

Figure 9:
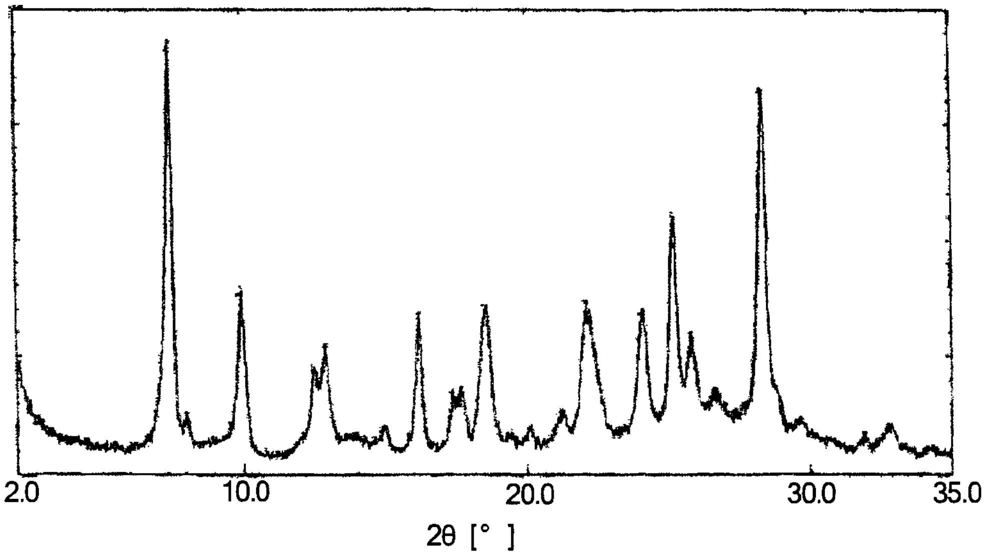
FIG. 9 is a graph showing the powder X-ray diffraction spectrum of Synthesis Example 1.

The powder X-ray diffraction spectrum of Hydroxygallium Phthalocyanine Composite Pigment 1 is shown in FIG. 9.

Synthesis Example 2

Preparation of Hydroxygallium Phthalocyanine Composite Pigment 2 of Hydroxygallium Phthalocyanine Pigment and Azo Pigment ((12)-2)(E=H)

To 100 mL of N,N-dimethylformamide, 0.91 parts by mass of the azo compound (the azo compound expressed by the above-presented formula (12)-2, E:$C_5H_9O_2$) which had been prepared in the method described in Example 3 of JP-A No. 2009-7523, and 0.90 parts by mass of Hydroxygallium Phthalocyanine Pigment 1 were added and the mixture was allowed to react for 6 hours at 120° C., while strongly stirring. After confirming the disappearance of the azo compound ((12)-2) by thin layer chromatography, the temperature of the mixture was returned to room temperature, and filtered through a fluoropore having a pore diameter of 0.1 μm.

To the obtained crystals, 100 mL of N,N-dimethylformamide was added, and the mixture was stirred for 2 hours at room temperature, followed by removing the crystals by filtration. This operation was repeated twice, and the same operation was performed again, provided that the solvent was changed to 2-butanone. Moreover, the same operation was carried out twice with about 100 mL of ion-exchanged water, followed by drying to thereby obtain 1.24 parts by mass (82% by mass) of Hydroxygallium Phthalocyanine Composite Pigment 2.

It was confirmed that the absorption derived from saturated hydrocarbon (2980 $cm^{-1}$) of the azo compound and the absorption based on the stretching vibration of C═O of the carbonate (1760 $cm^{-1}$ were disappeared on the IR absorption spectrum (the KBr pellet technique) of Hydroxygallium Phthalocyanine Composite Pigment 2.

Figure 10:
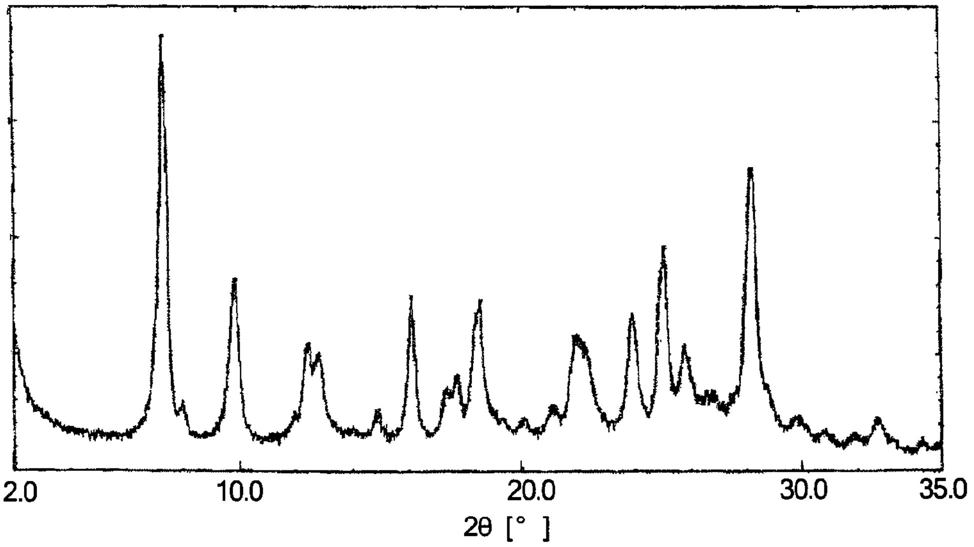
FIG. 10 is a graph showing the powder X-ray diffraction spectrum of Synthesis Example 2.

The powder X-ray diffraction spectrum of Hydroxygallium Phthalocyanine Composite Pigment 2 is shown in FIG. 10.

Synthesis Example 3

Preparation of Hydroxygallium Phthalocyanine Composite Pigment 3 of Hydroxygallium Phthalocyanine Pigment And Azo Pigment ((12)-4)(E=H)

To 100 mL of N,N-dimethylformamide, 0.89 parts by mass of the azo compound (the azo compound expressed by the above-presented formula (12)-4, E:$C_5H_9O_2$) which had been prepared in the method described in Example 2 of JP-A No. 2009-7523, and 0.90 parts by mass of Hydroxygallium Phthalocyanine Pigment 1 were added and the mixture was allowed to react for 7 hours under return current, while strongly stirring. After confirming the disappearance of the azo compound ((12)-4) by thin layer chromatography, the temperature of the mixture was returned to room temperature, and filtered through a fluoropore having a pore diameter of 0.1 μm.

To the obtained crystals, 100 mL of N,N-dimethylformamide was added, and the mixture was stirred for 2 hours at room temperature, followed by removing the crystals by filtration. This operation was performed one more time, and the same operation was repeated again, provided that the solvent was changed to 2-butanone. Moreover, the same operation was carried out twice with about 100 mL of ion-exchanged water, followed by drying to thereby obtain 1.36 parts by mass (91% by mass) of Hydroxygallium Phthalocyanine Composite Pigment 3.

It was confirmed that the absorption derived from saturated hydrocarbon (2980 $cm^{-1}$) of the azo compound and the absorption based on the stretching vibration of C═O of the carbonate (1760 $cm^{-1}$) were disappeared on the IR absorption spectrum (the KBr pellet technique) of Hydroxygallium Phthalocyanine Composite Pigment 3.

Figure 11:
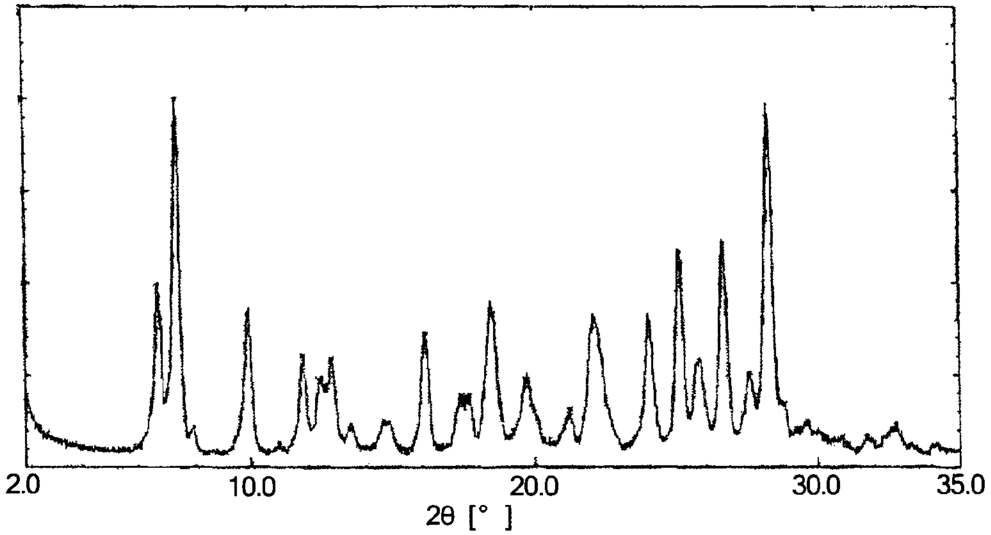
FIG. 11 is a graph showing the powder X-ray diffraction spectrum of Synthesis Example 3.

The powder X-ray diffraction spectrum of Hydroxygallium Phthalocyanine Composite Pigment 3 is shown in FIG. 11.

Synthesis Example 4

Preparation of Hydroxygallium Phthalocyanine Composite Pigment 4 of Hydroxygallium Phthalocyanine Pigment And Azo Pigment ((13)-1)(E=H)

To 100 mL of N,N-dimethylformamide, 1.01 parts by mass of the azo compound (the azo compound expressed by the above-presented formula (13)-1, E:$C_5H_9O_2$) which had been prepared in the method described in Example 7 of JP-A No. 2009-7523, and 0.90 parts by mass of Hydroxygallium Phthalocyanine Pigment 1 were added and the mixture was allowed to react for 7 hours under return current, while strongly stirring. After confirming the disappearance of the azo compound ((13)-1) by thin layer chromatography, the temperature of the mixture was returned to room temperature, and filtered through a fluoropore having a pore diameter of 0.1 μm.

To the obtained crystals, 100 mL of N,N-dimethylformamide was added, and the mixture was stirred for 2 hours at room temperature, followed by removing the crystals by filtration. This operation was repeated twice, and then the same operation was carried out again, provided that the solvent was changed to 2-butanone. Moreover, the same operation was carried out twice with about 100 mL of ion-exchanged water, followed by drying to thereby obtain 1.54 parts by mass (96% by mass) of Hydroxygallium Phthalocyanine Composite Pigment 4.

It was confirmed that the absorption derived from saturated hydrocarbon (2980 $cm^{-1}$) of the azo compound and the absorption based on the stretching vibration of C═O of the carbonate (1760 $cm^{-1}$) were disappeared on the IR absorption spectrum (the KBr pellet technique) of Hydroxygallium Phthalocyanine Composite Pigment 4.

Figure 12:
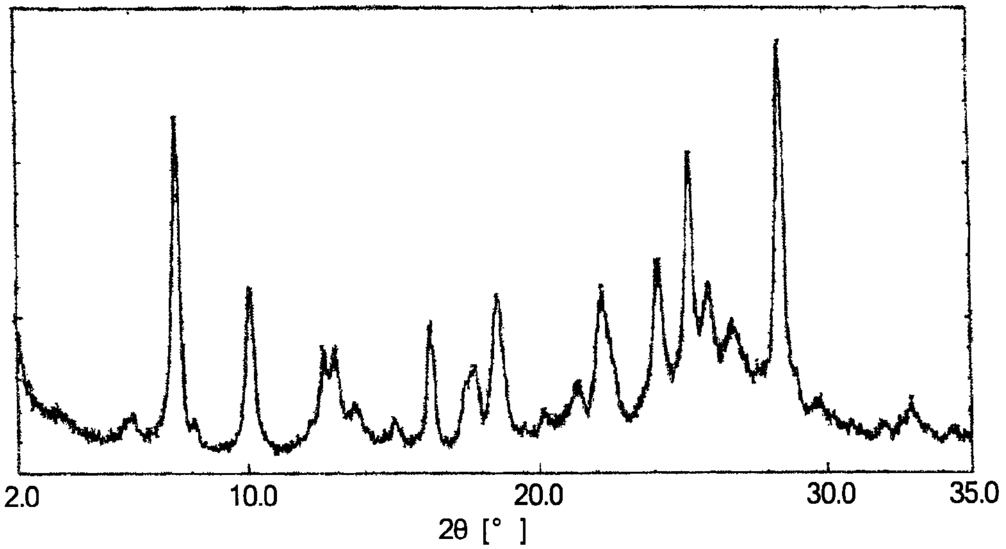
FIG. 12 is a graph showing the powder X-ray diffraction spectrum of Synthesis Example 4.

The powder X-ray diffraction spectrum of Hydroxygallium Phthalocyanine Composite Pigment 4 is shown in FIG. 12.

Synthesis Example 5

Preparation of Hydroxygallium Phthalocyanine Composite Pigment 5 of Hydroxygallium Phthalocyanine Pigment And Azo Pigment ((12)-2)(E=H)

To 100 mL of chlorobenzene, 0.18 parts by mass of the azo compound (the azo compound expressed by the above-presented formula (12)-2, E:$C_5H_9O_2$) which had been prepared in the method described in Example 3 of JP-A No. 2009-7523, and 0.90 parts by mass of Hydroxygallium Phthalocyanine Pigment 2 were added, and the mixture was allowed to react for 15 hours under return current, while strongly stirring. After confirming the disappearance of the azo compound ((12)-2) by thin layer chromatography, the temperature of the mixture was returned to room temperature, and filtered through a fluoropore having a pore diameter of 0.1 μm.

To the obtained crystals, 100 mL of 2-butanone was added, and the mixture was stirred for 2 hours at room temperature, followed by removing the crystals by filtration. This operation was repeated twice, and then the same operation was carried out twice, provided that the solvent was changed to about 100 mL of ion-exchanged water. The resultant was then dried to thereby obtain 0.89 parts by mass (87% by mass) of Hydroxygallium Phthalocyanine Composite Pigment 5.

It was confirmed that the absorption derived from saturated hydrocarbon (2980 $cm^{-1}$) of the azo compound and the absorption based on the stretching vibration of C═O of the carbonate (1760 $cm^{-1}$) were disappeared on the IR absorption spectrum (the KBr pellet technique) of Hydroxygallium Phthalocyanine Composite Pigment 5.

The powder X-ray diffraction spectrum of Hydroxygallium Phthalocyanine Composite Pigment 5 had the identical pattern to that of the spectrum of Synthesis Example 2.

Synthesis Example 6

Preparation of Hydroxygallium Phthalocyanine Composite Pigment 6 of Hydroxygallium Phthalocyanine Pigment And Azo Pigment ((12)-2)(E=H)

To 70 mL of N,N-dimethylformamide, 0.36 parts by mass of the azo compound (the azo compound expressed by the above-presented formula (12)-2, E:$C_5H_9O_2$) which had been prepared in the method described in Example 3 of JP-A No. 2009-7523, and 0.90 parts by mass of Hydroxygallium Phthalocyanine Pigment 2 were added and the mixture was allowed to react for 5 hours under return current, while strongly stirring. After confirming the disappearance of the azo compound ((12)-2) by thin layer chromatography, the temperature of the mixture was returned to room temperature, and filtered through a fluoropore having a pore diameter of 0.1 μm.

To the obtained crystals, 100 mL of N,N-dimethylformamide was added, and the mixture was stirred for 2 hours at room temperature, followed by removing the crystals by filtration. This operation was repeated twice, and then the same operation was carried out again, provided that the solvent was changed to 2-butanone. Moreover, the same operation was carried out twice with about 100 mL of ion-exchanged water, followed by drying to thereby obtain 1.04 parts by mass (91% by mass) of Hydroxygallium Phthalocyanine Composite Pigment 6.

It was confirmed that the absorption derived from saturated hydrocarbon (2980 $cm^{-1}$) of the azo compound and the absorption based on the stretching vibration of C═O of the carbonate (1760 $cm^{-1}$) were disappeared on the IR absorption spectrum (the KBr pellet technique) of Hydroxygallium Phthalocyanine Composite Pigment 6.

The powder X-ray diffraction spectrum of Hydroxygallium Phthalocyanine Composite Pigment 6 had the identical pattern to that of the spectrum of Synthesis Example 2.

Synthesis Example 7

Preparation of Hydroxygallium Phthalocyanine Composite Pigment 7 of Hydroxygallium Phthalocyanine Pigment And Azo Pigment ((12)-2)(E=H)

To 70 mL of dimethylsulfoxide, 1.81 parts by mass of the azo compound (the azo compound expressed by the above-presented formula (12)-2, E:$C_5H_9O_2$) which had been prepared in the method described in Example 3 of JP-A No. 2009-7523, and 0.90 parts by mass of Hydroxygallium Phthalocyanine Pigment 2 were added, and the mixture was allowed to react for 5 hours at 170° C., while strongly stirring. After confirming the disappearance of the azo compound ((12)-2) by thin layer chromatography, the temperature of the mixture was returned to room temperature, and filtered through a fluoropore having a pore diameter of 0.1 μm.

To the obtained crystals, 100 mL of N,N-dimethylformamide was added, and the mixture was stirred for 2 hours at room temperature, followed by removing the crystals by filtration. This operation was repeated twice, and then the same operation was carried out once, provided that the solvent was changed to 2-butanone. Moreover, the same operation was carried out twice with about 100 mL of ion-exchanged water, followed by drying to thereby obtain 1.98 parts by mass (94% by mass) of Hydroxygallium Phthalocyanine Composite Pigment 7.

It was confirmed that the absorption derived from saturated hydrocarbon (2980 $cm^{-1}$) of the azo compound and the absorption based on the stretching vibration of C═O of the carbonate (1760 $cm^{-1}$) were disappeared on the IR absorption spectrum (the KBr pellet technique) of Hydroxygallium Phthalocyanine Composite Pigment 7.

The powder X-ray diffraction spectrum of Hydroxygallium Phthalocyanine Composite Pigment 7 had the identical pattern to that of the spectrum of Synthesis Example 2.

Example 1

Example of Electrophotographic Photoconductor

Onto an aluminum cylinder (diameter: 100 mm, length: 360 mm) serving as a conductive support, the undercoat layer coating liquid of the formulation presented below, the charge-generating layer coating liquid of the formulation presented below, and the charge-transporting layer coating liquid of the formulation presented below were sequentially applied by dip coating, followed by drying, so that an undercoat layer having a thickness of about 3.5 μm, and a charge-transporting layer having a thickness of about 28 μm were formed to thereby prepare a laminate photoconductor. Moreover, a thickness of a charge-generating layer was adjusted so that the charge-generating layer would have transmittance of 10% to light of 780 nm. The transmittance of the charge-generating layer was evaluated by applying the charge-generating layer coating liquid of the formulation presented below onto an aluminum cylinder around which a polyethylene terephthalate film was wound in the same coating manner as in the preparation of the photoconductor, and measuring the transmittance thereof at 780 nm by means of the commercially available spectrophotometer (Shimadzu Corporation: UV-3600) using, as a comparison sample, a polyethylene terephthalate film to which the charge-generating layer coating liquid was not provided. Note that, the charge-generating layer coating liquid was prepared by dispersing components thereof by a bead mill. After coating each layer and setting to touch, the undercoat layer was dried for 20 minutes at 130° C., the charge-generating layer was dried for 20 minutes at 100° C., and the charge-transporting layer was dried for 20 minutes at 130° C. Thereafter, onto the charge-transporting layer, the protective layer coating liquid of the formulation presented below was applied by spray coating, and the coated film was crosslinked by applying light thereto using a metal halide lamp (160 W/cm) at the radiation intensity of 500 $mW/cm^2$, for 60 seconds. Thereafter, the crosslinked film was heated and dried for 20 minutes at 130° C. so as to form a protective layer having a thickness of 5 μm to thereby obtain Electrophotographic Photoconductor 1.

| (Undercoat Layer Coating Liquid) | |
|---|---|
| Titanium oxide, CR-EL (manufactured by Ishihara Sangyo Kaisha, Ltd.) | 50 parts by mass |
| Alkyd resins, BECKOLITE M6401-50 (solid content: 50% by mass, manufactured by DIC Corporation) | 14 parts by mass |
| Melamine resin, L-145-60 (solid content: 60% by mass, manufactured by DIC Corporation) | 8 parts by mass |
| 2-butanone | 120 parts by mass |

| (Charge-Generating Layer Coating Liquid) | |
|---|---|
| Hydroxygallium Phthalocyanine Composite Pigment 1 | 10 parts by mass |
| Polyvinyl butyral resin BX-1 (manufactured by Sekisui Chemical Co., Ltd.) | 10 parts by mass |
| MEK | 600 parts by mass |

| (Charge-Transporting Layer Coating Liquid) | |
|---|---|
| Bisphenol-Z polycarbonate (PANLITE TS-2050, manufactured by Teijin Chemicals Ltd.) | 10 parts by mass |
| Charge-transporting material expressed by the following structural formula (15) | 7 parts by mass |
| Tetrahydrofuran | 80 parts by mass |

-continued

| | |
|---|---|
| 1%-Silicone oil tetrahydrofuran solution (KF50-1CS, manufactured by Shin-Etsu Chemical Co., Ltd.) | 0.2 parts by mass |

Structural Formula (15)

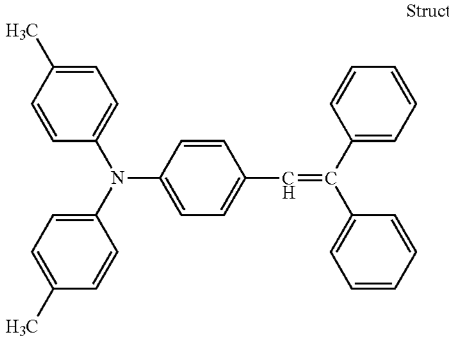

| (Protective Layer Coating Liquid) | |
|---|---|
| Tri- or higher polyfunctional radical polymerizable monomer having no charge-transporting structure [trimethylolpropane triacrylate] (KAYARAD TMPTA, manufactured by Nippon Kayaku Co., Ltd., molecular weight: 296, number of functional groups: 3, molecular weight/number of functional group = 99) | 10 parts by mass |
| Radical polymerizable compound having a monofunctional charge-transporting structure expressed by the following structural formula (16) | 10 parts by mass |

Structural Formula (16)

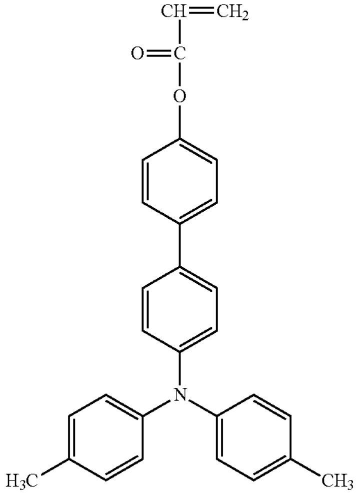

| | |
|---|---|
| Photopolymerization initiator (1-hydroxy cyclohexyl phenyl ketone; IRGACURE 184, manufactured by Ciba Specialty Chemicals Corporation) | 1 part by mass |
| Tetrahydrofuran | 100 parts by mass |

Example 2

Electrophotographic Photoconductor 2 was obtained in the same manner as in Example 1, provided that Hydroxygallium Phthalocyanine Composite Pigment 1 contained in the coating liquid for the charge-generating layer was changed to Hydroxygallium Phthalocyanine Composite Pigment 2.

Example 3

Electrophotographic Photoconductor 3 was obtained in the same manner as in Example 1, provided that Hydroxygallium Phthalocyanine Composite Pigment 1 contained in the coating liquid for the charge-generating layer was changed to Hydroxygallium Phthalocyanine Composite Pigment 3.

Example 4

Electrophotographic Photoconductor 4 was obtained in the same manner as in Example 1, provided that Hydroxygallium Phthalocyanine Composite Pigment 1 contained in the coating liquid for the charge-generating layer was changed to Hydroxygallium Phthalocyanine Composite Pigment 4.

Example 5

Electrophotographic Photoconductor 5 was obtained in the same manner as in Example 1, provided that Hydroxygallium Phthalocyanine Composite Pigment 1 contained in the coating liquid for the charge-generating layer was changed to Hydroxygallium Phthalocyanine Composite Pigment 5.

Example 6

Electro-photographic Photoconductor 6 was obtained in the same manner as in Example 1, provided that Hydroxygallium Phthalocyanine Composite Pigment 1 contained in the coating liquid for the charge-generating layer was changed to Hydroxygallium Phthalocyanine Composite Pigment 6.

Example 7

Electrophotographic Photoconductor 7 was obtained in the same manner as in Example 1, provided that Hydroxygallium Phthalocyanine Composite Pigment 1 contained in the coating liquid for the charge-generating layer was changed to Hydroxygallium Phthalocyanine Composite Pigment 7.

Comparative Example 1

Electrophotographic Photoconductor 8 was obtained in the same manner as in Example 1, provided that Hydroxygallium Phthalocyanine Composite Pigment 1 contained in the coating liquid for the charge-generating layer was changed to Hydroxygallium Phthalocyanine Pigment 2 synthesized in Comparative Synthesis Example 2.

Comparative Example 2

Electrophotographic Photoconductor 9 was obtained in the same manner as in Example 1, provided that the coating liquid for the charge-generating layer of Example 1 was changed as follows.

| (Charge-Generating Layer Coating Liquid) | |
|---|---|
| Hydroxygallium Phthalocyanine Pigment 2 of Comparative Synthesis Example 2 | 5 parts by mass |
| Azo pigment ((12)-2) | 5 parts by mass |
| Polyvinyl butyral resin BX-1 (Sekisui Chemical Co., Ltd.) | 10 parts by mass |
| MEK | 600 parts by mass |

Comparative Example 3

Electrophotographic Photoconductor 10 was obtained in the same manner as in Example 1, provided that the coating liquid for the charge-generating layer of Example 1 was changed as follows.

| (Charge-Generating Layer Coating Liquid) | |
|---|---|
| Hydroxygallium Phthalocyanine Pigment 1 of Comparative Synthesis Example 1 | 5 parts by mass |
| Azo pigment ((12)-3) | 5 parts by mass |
| Polyvinyl butyral resin BX-1 (Sekisui Chemical Co., Ltd.) | 10 parts by mass |
| MEK | 600 parts by mass |

Comparative Example 4

Electro-photographic Photoconductor 11 was obtained in the same manner as in Example 1, provided that the coating liquid for the charge-generating layer of Example 1 was changed as follows.

| (Charge-Generating Layer Coating Liquid) | |
|---|---|
| Hydroxygallium Phthalocyanine Pigment 1 of Comparative Synthesis Example 1 | 5 parts by mass |
| Azo pigment ((12)-4) | 5 parts by mass |
| Polyvinyl butyral resin BX-1 (Sekisui Chemical Co., Ltd.) | 10 parts by mass |
| MEK | 600 parts by mass |

Comparative Example 5

Electrophotographic Photoconductor 12 was obtained in the same manner as in Example 1, provided that the coating liquid for the charge-generating layer of Example 1 was changed as follows.

| (Charge-Generating Layer Coating Liquid) | |
|---|---|
| Hydroxygallium Phthalocyanine Pigment 1 of Comparative Synthesis Example 1 | 5 parts by mass |
| Azo pigment ((13)-1) | 5 parts by mass |
| Polyvinyl butyral resin BX-1 (Sekisui Chemical Co., Ltd.) | 10 parts by mass |
| MEK | 600 parts by mass |

<Evaluation using Actual Device>

A paper running test on an actual device was performed as follows. Specifically, the aforementioned electrophotographic photoconductor was mounted to an electrophotographic process cartridge, and a modified device of IMAGIO Neo 751 manufactured by Ricoh Company Limited (linear velocity of photoconductor: 350 mm/sec., wavelength of LD exposure light: 780 nm) was used as an image forming device. The surface potential of the light area of the photoconductor, which had been exposed to light to form an electrostatic latent image, was measured, in the manner described below, under low temperature and low humidity environment, and under normal temperature and normal humidity environment, at the initial stage of the test, and after the paper running test in which 300,000 pieces were printed using the aforementioned device (A4, MyPaper manufactured by Ricoh Business Expert, Ltd., electric potential at the beginning of the test: −800 V).

After storing the photoconductor for 24 hours under low temperature and low humidity environment (temperature: 10° C., relative humidity: 15% RH), or under normal temperature and normal humidity environment (temperature: 23°

C., relative humidity: 55% RH), the surface potential of the light area (VL) of the photoconductor stored in each environment was measured. The surface potential was measured by attaching, to the developing unit, a potentiometer probe connected to a surface potential meter so as to be 50 mm above from the outermost surface of the photoconductor, mounting the photoconductor in such device, adjusting the grid potential so that the dark area of the photoconductor had the surface potential of −800(V), and outputting a black solid image. As the surface potentiometer, TREK MODEL 344 Electrostatic Voltmeter, manufactured by TREK Japan Co., Ltd., was used. The image quality of the print after printing 300,000 pieces was evaluated based on the following evaluation criteria.

A: There is hardly any reduction in image quality.

B: Reduction in image quality can be observed visually.

C: There is a significant problem in image quality.

TABLE 1

| Example/ Comparative Example | Photoconductor | Initial | | After printing 300,000 pieces | | |
|---|---|---|---|---|---|---|
| | | VL[−V] under LL | VL[−V] under NN | VL[−V] under LL | VL[−V] under NN | Image quality after printing test |
| Ex. 1 | Photoconductor 1 | 180 | 170 | 210 | 200 | A |
| Ex. 2 | Photoconductor 2 | 170 | 150 | 180 | 170 | A |
| Ex. 3 | Photoconductor 3 | 170 | 160 | 210 | 190 | A |
| Ex. 4 | Photoconductor 4 | 180 | 170 | 220 | 200 | A |
| Ex. 5 | Photoconductor 5 | 140 | 120 | 170 | 150 | A |
| Ex. 6 | Photoconductor 6 | 140 | 130 | 170 | 150 | A |
| Ex. 7 | Photoconductor 7 | 180 | 170 | 200 | 200 | B |
| Comp. Ex. 1 | Photoconductor 8 | 180 | 170 | 290 | 250 | C |
| Comp. Ex. 2 | Photoconductor 9 | 190 | 170 | 300 | 270 | C |
| Comp. Ex. 3 | Photoconductor 10 | 220 | 200 | 300 | 280 | C |
| Comp. Ex. 4 | Photoconductor 11 | 200 | 190 | 290 | 260 | C |
| Comp. Ex. 5 | Photoconductor 12 | 220 | 210 | 320 | 290 | C |

Note that, in Table 1, "LL" denotes low temperature and low humidity, and "NN" denotes normal temperature and normal humidity.

Note that, in Table 1, "LL" denotes low temperature and low humidity, and "NN" denotes normal temperature and normal humidity.

What is claimed is:

1. A hydroxygallium phthalocyanine composite pigment, which is a composite pigment wherein an azo compound expressed by the following general formula (a) is conjugated to a hydroxygallium phthalocyanine pigment, wherein the hydroxygallium phthalocyanine composite pigment has diffraction peaks at least at 7.5°, 9.9°, 12.5°, 16.3°, 18.6°, 25.1°, and 28.3° on an X-ray diffraction spectrum with Bragg angle of 2θ±0.2°, using Cu-Kα X-rays:

$A(H)_n$ General Formula (a)

where A is a residue of an azo compound; H is a hydrogen atom; the residue A is bonded to one or more hydrogen atoms, where the number of the hydrogen atoms is expressed with n, via one or more heteroatoms which are selected from the group consisting of N and O, and form part of the residue A; and n is an integer of 1 to 9.

2. The hydroxygallium phthalocyanine composite pigment according to claim 1, wherein the hydroxygallium phthalocyanine pigment is present beside when the azo compound having a carboester group expressed by the following general formula (I) is dissolved and de-esterified to form the azo compound expressed by the general formula (a):

$A(E)_n$ General Formula (I)

where A is a residue of an azo compound, which is bonded to E groups, where the number of the E groups is expressed with n, via one or more hetero atoms which are selected from the group consisting of N and O and form part of the residue A; the E groups are each independently selected from the group consisting of a hydrogen atom and a carboester group expressed by: $—C(═O)—O—R^0$ where $R^0$ is a C4-10 substituted or unsubstituted alkyl group, a C4-10 substituted or unsubstituted alkenyl group, a C4-10 substituted or unsubstituted alkynyl group, a C4-10 substituted or unsubstituted cycloalkyl group, a C4-10 substituted or unsubstituted cycloalkenyl group, or a C4-10 substituted or unsubstituted aralkyl group, provided that there is no case where all of the E groups are hydrogen atoms; and n is an integer of 1 to 9.

3. The hydroxygallium phthalocyanine composite pigment according to claim 1, wherein the azo compound expressed by any of the general formulae (a) and (I) is an azo compound including the residue A expressed by the following general formula (2):

$B—(N═N\text{-}Cp)_m$ General Formula (2)

where B is a principal skeleton of an azo compound, Cp is a residue of a coupler component, and m is an integer of 2 or 3.

4. The hydroxygallium phthalocyanine composite pigment according to claim 3, wherein Cp is the residue of the coupler component, expressed by at least one of the following general formulae (3) to (11):

General Formula (3)

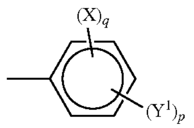

General Formula (4)

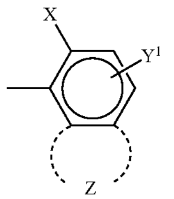

General Formula (5)

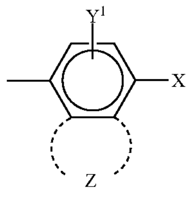

-continued

General Formula (6)

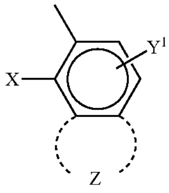

where X, $Y^1$, Z, p and q are each as follows:

X: —OH, —$N(R^1)(R^2)$, or —$NHSO_2$—$R^3$, where $R^1$ and $R^2$ are each independently a hydrogen atom, or a substituted or unsubstituted alkyl group, and $R^3$ is a substituted or unsubstituted alkyl group, or a substituted or unsubstituted aryl group, $Y^1$: a hydrogen atom, a halogen atom, a substituted or unsubstituted alkyl group, a substituted or unsubstituted alkoxy group, a carboxyl group, a sulfone group, a substituted or unsubstituted sulfamoyl group, or —CON$(R^4)(Y^2)$, where $R^4$ is a hydrogen atom, a substituted or unsubstituted alkyl group, or a substituted or unsubstituted phenyl group; $Y^2$ is a substituted or unsubstituted hydrocarbon cyclic group, a substituted or unsubstituted heterocyclic group, or —N═C$(R^5)(R^6)$, in which $R^5$ is a substituted or unsubstituted hydrocarbon cyclic group, a substituted or unsubstituted heterocyclic group, or a substituted or unsubstituted styryl group, $R^6$ is a hydrogen atom, a substituted or unsubstituted alkyl group, a substituted or unsubstituted phenyl group, or $R^5$ and $R^6$ may form a ring with carbon atoms bonded to $R^5$ and $R^6$, Z: a substituted or unsubstituted hydrocarbon ring, or a substituted or unsubstituted heterocycle, p: an integer of 1 or 2, q: an integer of 1 or 2, General Formula (7)

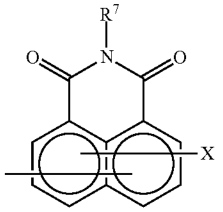

where X is —OH, —$N(R^1)(R^2)$, or —$NHSO_2$—$R^3$, in which $R^1$ and $R^2$ are each independently a hydrogen atom, or a substituted or unsubstituted alkyl group, and $R^3$ is a substituted or unsubstituted alkyl group, or a substituted or unsubstituted aryl group; and $R^7$ is a substituted or unsubstituted hydrocarbon group, General Formula (8)

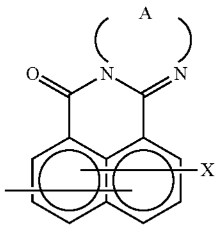

where X is —OH, —$N(R^1)(R^2)$, or —$NHSO_2$—$R^3$, in which $R^1$ and $R^2$ are each independently a hydrogen atom, or a substituted or unsubstituted alkyl group, and $R^3$ is a substituted or unsubstituted alkyl group, or a substituted or unsubstituted aryl group; and A is a hetero atom-containing bivalent group containing either a bivalent aromatic hydrocarbon group or a nitrogen atom, which is necessary for forming a nitrogen-containing heterocycle together with the two nitrogen atoms presented in the formula (8), where the aromatic ring of the bivalent aromatic hydrocarbon group and the heterocycle may be substituted or unsubstituted, General Formula (9)

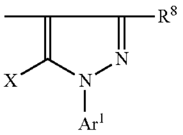

where X is —OH, —$N(R^1)(R^2)$, or —$NHSO_2$—$R^3$, in which $R^1$ and $R^2$ are each independently a hydrogen atom, or a substituted or unsubstituted alkyl group, and $R^3$ is a substituted or unsubstituted alkyl group, or a substituted or unsubstituted aryl group; $R^8$ is an alkyl group, a carbamoyl group, a carboxyl group, or ester thereof; and $Ar^1$ is a substituted or unsubstituted hydrocarbon cyclic group, General Formula (10)

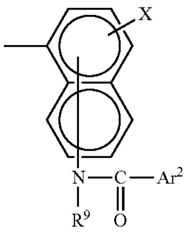

General Formula (11)

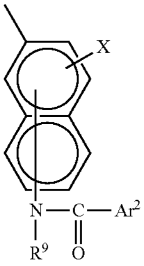

where, in the general formulae (10) and (11), X is —OH, —$N(R^1)(R^2)$, or —$NHSO_2$—$R^3$, in which $R^1$ and $R^2$ are each independently a hydrogen atom, or a substituted or unsubstituted alkyl group, and $R^3$ is a substituted or unsubstituted alkyl group, or a substituted or unsubstituted aryl group; $R^9$ is a hydrogen atom, or a substituted or unsubstituted hydrocarbon group; and $Ar^2$ is a substituted or unsubstituted hydrocarbon cyclic group, provided that there is no case where $Ar^2$ is a cycloalkyl group, or a cycloalkenyl group with $R^9$ being a hydrogen atom.

5. The hydroxygallium phthalocyanine composite pigment according to claim 3, wherein the principal skeleton B contained in the azo compound expressed by the general formula (2) is expressed by the following general formula (12):

General Formula (12)

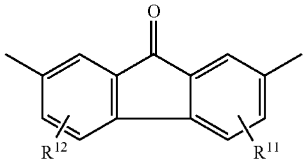

where $R^{11}$ and $R^{12}$ are each independently a hydrogen atom, a halogen atom, a substituted or unsubstituted alkyl group, a substituted or unsubstituted alkoxy group, a carboxyl group, or an ester thereof.

6. The hydroxygallium phthalocyanine composite pigment according to claim 3, wherein the principal skeleton B contained in the azo compound expressed by the general formula (2) is expressed by the following general formula (13):

General Formula (13)

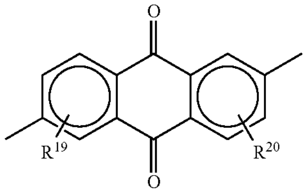

where $R^{19}$ and $R^{20}$ are each independently a hydrogen atom, a halogen atom, a substituted or unsubstituted alkyl group, a substituted or unsubstituted alkoxy group, a carboxyl group, or an ester thereof.

7. An electrophotographic photoconductor, comprising:

a conductive support, and a photosensitive layer disposed on the conductive support, and containing a hydroxygallium phthalocyanine composite pigment, wherein the hydroxygallium phthalocyanine composite pigment is a composite pigment in which an azo compound expressed by the following general formula (a) is conjugated to a hydroxygallium phthalocyanine pigment, wherein the hydroxygallium phthalocyanine composite pigment has diffraction peaks at least at 7.5°, 9.9°, 12.5°, 16.3°, 18.6°, 25.1°, and 28.3° on an X-ray diffraction spectrum with Bragg angle of 2θ±0.2°, using Cu-Kα X-rays:

$A(H)_n$ General Formula (a)

where A is a residue of an azo compound; H is a hydrogen atom; the residue A is bonded to one or more hydrogen atoms, where the number of the hydrogen atoms is expressed with n, via one or more heteroatoms which are selected from the group consisting of N and O, and form part of the residue A; and n is an integer of 1 to 9.

8. An image forming device, comprising:

a charging unit;

an exposing unit;

a developing unit;

a transferring unit; and an electrophotographic photoconductor, wherein the electrophotographic photoconductor comprises:

a conductive support, and a photosensitive layer disposed on the conductive support, and containing a hydroxygallium phthalocyanine composite pigment, wherein the hydroxygallium phthalocyanine composite pigment is a composite pigment in which an azo compound expressed by the following general formula (a) is conjugated to a hydroxygallium phthalocyanine pigment, wherein the hydroxygallium phthalocyanine composite pigment has diffraction peaks at least at 7.5°, 9.9°, 12.5°, 16.3°, 18.6°, 25.1°, and 28.3° on an X-ray diffraction spectrum with Bragg angle of 2θ±0.2°, using Cu-Kα X-rays:

$A(H)_n$ General Formula (a)

where A is a residue of an azo compound; H is a hydrogen atom; the residue A is bonded to one or more hydrogen atoms, where the number of the hydrogen atoms is expressed with n, via one or more heteroatoms which are selected from the group consisting of N and O, and form part of the residue A; and n is an integer of 1 to 9.

9. The image forming device according to claim 8, wherein the electrophotographic photoconductor and at least one selected from the group consisting of the charging unit, the exposing unit, the developing unit, transferring unit, and a cleaning unit are integratedly formed into a cartridge, and the cartridge is detachably mounted to a body of the image forming device.

* * * * *